United States Patent
Jang et al.

(10) Patent No.: US 9,191,934 B2
(45) Date of Patent: Nov. 17, 2015

(54) METHOD AND APPARATUS FOR TRANSMITTING CHANNEL QUALITY CONTROL INFORMATION USING PUCCH FORMAT 3 IN A WIRELESS ACCESS SYSTEM

(75) Inventors: Jiwoong Jang, Anyang-si (KR); Jaehoon Chung, Anyang-si (KR); Seunghee Han, Anyang-si (KR); Hyunsoo Ko, Anyang-si (KR); Moonil Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 14/004,342

(22) PCT Filed: Mar. 7, 2012

(86) PCT No.: PCT/KR2012/001671
§ 371 (c)(1),
(2), (4) Date: Sep. 10, 2013

(87) PCT Pub. No.: WO2012/121546
PCT Pub. Date: Sep. 13, 2012

(65) Prior Publication Data
US 2013/0343327 A1 Dec. 26, 2013

Related U.S. Application Data

(60) Provisional application No. 61/451,122, filed on Mar. 10, 2011, provisional application No. 61/454,988, filed on Mar. 21, 2011.

(51) Int. Cl.
*H04W 4/00* (2009.01)
*H04W 72/04* (2009.01)
(Continued)

(52) U.S. Cl.
CPC .......... *H04W 72/0413* (2013.01); *H04J 13/22* (2013.01); *H04L 1/0026* (2013.01);
(Continued)

(58) Field of Classification Search
None
See application file for complete search history.

(56) References Cited

U.S. PATENT DOCUMENTS

2010/0272019 A1* 10/2010 Papasakellariou et al. ... 370/328
2010/0278109 A1 11/2010 Papasakellariou et al.
(Continued)

FOREIGN PATENT DOCUMENTS

KR 10-2009-0086031 A 8/2009

OTHER PUBLICATIONS

CMCC et al, "Way Forward on Supporting ACK/NAK Payload Larger than 11 Bits in Rel-10 TDD", TSG-RAN WG1 Meeting #62bis, Xi'an, China, Oct. 11-15, 2010, R1-105776, 2 pages.
(Continued)

*Primary Examiner* — Michael J Moore, Jr.
(74) *Attorney, Agent, or Firm* — Birch, Stewart, Kolasch & Birch, LLP

(57) ABSTRACT

A method of coding and transmitting channel quality control information through a physical uplink control channel (PUCCH) is disclosed. The method of transmitting channel state control information (CQI and/or PMI) in a wireless access system includes performing channel coding with respect to the channel state control information according to a payload size of the channel state control information, performing rate matching with respect to the channel state control information coded through channel coding according to physical uplink control channel (PUCCH) format 3, and transmitting the channel state control information using the PUCCH format 3.

12 Claims, 25 Drawing Sheets

(51) Int. Cl.
H04J 13/22 (2011.01)
H04L 1/00 (2006.01)
H04L 5/00 (2006.01)

(52) U.S. Cl.
CPC ............ *H04L1/0073* (2013.01); *H04L 5/001* (2013.01); *H04L 5/0044* (2013.01); *H04L 5/0053* (2013.01); *H04L 5/0057* (2013.01); H04L 1/0031 (2013.01); H04L 1/0067 (2013.01); H04L 5/0016 (2013.01); H04L 5/0023 (2013.01)

(56) References Cited

U.S. PATENT DOCUMENTS

| | | | |
|---|---|---|---|
| 2011/0026478 A1 | 2/2011 | Lee et al. | |
| 2011/0249578 A1* | 10/2011 | Nayeb Nazar et al. | 370/252 |
| 2012/0127869 A1* | 5/2012 | Yin et al. | 370/252 |
| 2012/0210187 A1* | 8/2012 | Yin et al. | 714/751 |
| 2012/0287828 A1* | 11/2012 | Chen et al. | 370/280 |
| 2014/0233523 A1* | 8/2014 | Jang et al. | 370/329 |

OTHER PUBLICATIONS

Huawei, HiSilicon, "Coding and resource mapping for UCI on PUSCH", 3GPP TSG RAN WG1 meeting #63, Jacksonville, USA, Nov. 15-19, 2010, R1-106446, 6 pages.

Qualcomm Incorporated, "Details of DFT-S-OFDM", 3GPP TSG-RAN WG1 #62, Madrid, Spain, Aug. 23-27, 2010, R1-104784, 5 pages.

Texas Instruments, "On periodic CSI reporting for Carrier Aggregation", 3GPP TSG RAN WG1 #63bis, Dublin, Ireland, Jan. 17-21, 2010, R1-110257, 4 pages.

ZTE, "Large ACK/NACK payload in support of CA in TDD", 3GPP TSG RAN WG1 Meeting #62bis, Xi'an, China, Oct. 11-15, 2010, R1-105714, 6 pages.

LG Electronics, "UL control channel design to support carrier aggregation", 3GPP TSG RAN WG1 #56bis, R1-091204, Seoul, Korea, Mar. 23-27, 2009, 6 pages.

NTT DoCoMo, "PUCCH Design for Carrier Aggregation in LTE-Advanced", 3GPP TSG RAN WG1 Meeting #58bis, R1-094238, Miyazaki, Japan, Oct. 12-16, 2009, pp. 1-4.

ZTE, "Uplink Control Channel Design for LTE-Advanced", TSG-RAN WG1 #56bis, R1-091427, Seoul, Korea, Mar. 23-27, 2009, pp. 1-6.

* cited by examiner (a)

(b)

(a)

(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

METHOD AND APPARATUS FOR TRANSMITTING CHANNEL QUALITY CONTROL INFORMATION USING PUCCH FORMAT 3 IN A WIRELESS ACCESS SYSTEM

CROSS REFERENCE TO RELATED APPLICATIONS

This application is the National Phase of PCT/KR 2012/001671 filed on Mar. 7, 2012, which claims priority under 35 U.S.C. 119(e) to U.S. Provisional Application No. 61/451,122 filed on Mar. 10, 2011 and to U.S. Provisional Application No. 61/454,988 filed on Mar. 21, 2011, all of which are incorporated by reference herein in its entirety.

TECHNICAL FIELD

The present invention relates to a wireless access system, and more particularly, to a method of coding and transmitting uplink control information (UCI) including channel quality control information in a carrier aggregation environment (that is, a multi-component carrier environment) and an apparatus for supporting the same. More particularly, the present invention relates to a method of coding and transmitting channel quality control information through a physical uplink control channel (PUCCH).

BACKGROUND ART

A $3^{rd}$ Generation Partnership Project Long Term Evolution (3GPP LTE) (or Rel-8 or Rel-9) system (hereinafter, referred to as an LTE system or a Rel-8 system) uses a multi-carrier modulation (MCM) scheme for segmenting and utilizing a single component carrier (CC) into several bands. However, in a 3GPP LTE-Advanced (hereinafter, referred to as an LTE-A system or a Rel-10 system), in order to support a system bandwidth wider than that of the LTE system, a method such as carrier aggregation (CA) for aggregating and utilizing one or more CCs may be used. CA is also called carrier matching, multi-CC environment or multi-carrier environment.

In a single CC environment such as an LTE system, only the case in which uplink control information (UCI) and data are multiplexed on one CC using a plurality of layers is described.

In addition, only ACK/NACK and scheduling request (SR) of up to 20 bits were transmitted in the existing PUCCH format 3 and only channel quality control information (CQI/PMI) of up to 11 bits was transmitted in another PUCCH format.

DISCLOSURE

Technical Problem

An object of the present invention is to provide a method of efficiently coding and transmitting uplink control information (UCI) in a carrier aggregation (CA) environment (or a multi-carrier environment).

Another object of the present invention is to provide various methods of transmitting channel quality control information using PUCCH format 3 in a CA environment.

Another object of the present invention is to provide a method of determining a payload size of channel quality control information pertinent to PUCCH format 3 if the channel quality control information is transmitted using PUCCH format 3.

Another object of the present invention is to provide a channel coding method corresponding to PUCCH format 3 if channel quality control information is transmitted using PUCCH format 3.

Another object of the present invention is to provide a user equipment and/or a base station supporting the above-described methods.

The objects achieved by the present invention are not limited to the above-described objects and those skilled in the art may consider other objects from the following description of the embodiments of the present invention.

Technical Solution

The present invention relates to methods and apparatuses for transmitting uplink control information (UCI) including channel quality control information in a carrier aggregation (CA) environment.

The object of the present invention can be achieved by providing a method of transmitting channel state control information in a wireless access system, the method including performing channel coding with respect to the channel state control information according to a payload size of the channel state control information, performing rate matching with respect to the channel state control information coded through channel coding according to physical uplink control channel (PUCCH) format 3, and transmitting the channel state control information using the PUCCH format 3.

In another aspect of the present invention, there is provided a user equipment (UE) for transmitting channel state control information in a wireless access system, the UE including a transmission module, a reception module, and a processor configured to support transmission of the channel state control information. At this time, the processor may include a channel coding block configured to code the channel state control information. The channel coding block performs channel coding with respect to the channel state control information according to a payload size of the channel state control information, performs rate matching with respect to the channel state control information coded through channel coding according to physical uplink control channel (PUCCH) format 3, and transmits the channel state control information through the transmission module using the PUCCH format 3.

If the payload size of the channel state control information is less than or equal to 11 bits, a user equipment (UE) may perform channel coding with respect to the channel state control information using a (20, A) Reed Muller (RM) code or a (32, O) RM code.

The UE may perform rate matching with 48 bits with respect to the channel state control information according to the PUCCH format 3. Alternatively, the UE may replicatively input the result of rate matching with 24 bits with respect to the channel state control information to two slots of the PUCCH format 3.

If the payload size of the channel state control information is equal to or greater than 12 bits, a user equipment (UE) may perform channel coding with respect to the channel state control information using a tail-biting convolutional coding (TBCC). At this time, the UE may perform interleaving using a subblock interleaver at the UE after coding the channel state control information using the TBCC.

Alternatively, if the payload size of the channel state control information is equal to or greater than 12 bits, a user equipment (UE) may perform channel coding with respect to the channel state control information using a dual Reed Muller (RM) code. At this time, a (20, A) RM code or a (32, O) RM code may be used as the dual RM code. The UE may perform rate matching with 24 bits with respect to two codewords coded using the dual RM code and map the codewords to two slots of the PUCCH format 3.

If the payload size of the channel state control information is less than or equal to 13 bits, a user equipment (UE) may perform channel coding with respect to the channel state control information using a (20, A) Reed Muller (RM) code. The UE may perform rate matching with 48 bits with respect to the channel state control information according to the PUCCH format 3. Alternatively, the UE may replicatively input the result of rate matching with 24 bits with respect to the channel state control information to two slots of the PUCCH format 3.

If the payload size of the channel state control information is equal to or greater than 14 bits, a user equipment (UE) may perform channel coding with respect to the channel state control information using a tail-biting convolutional coding (TBCC). The UE may perform interleaving using a subblock interleaver at the UE after coding the channel state control information using the TBCC.

If the payload size of the channel state control information is equal to or greater than 14 bits, a user equipment (UE) may perform channel coding with respect to the channel state control information using a dual Reed Muller (RM) code. At this time, a (20, A) RM code or a (32, O) RM code may be used as the dual RM code. Alternatively, the UE may perform rate matching with 24 bits with respect to two codewords coded using the dual RM code and map the codewords to two slots of the PUCCH format 3.

The aforementioned aspects of the present invention are merely some of the preferred embodiments of the present invention and various embodiments to which the technical features of the present invention are applied will be obtained and understood from the following detailed description by those skilled in the art.

Advantageous Effects

According to the embodiments of the present invention, the following effects are obtained.

First, it is possible to efficiently code and transmit uplink control information (UCI) in a carrier aggregation (CA) environment (or a multi-carrier environment).

Second, it is possible to efficiently transmit channel quality control information using PUCCH format 3 in a CA environment.

For example, as the number of component carriers (CCs) (that is, cells) used in the CA environment is increased, the amount of channel quality control information may increased. In this case, as compared to the case in which CQI is transmitted using a PUCCH format, CQI can be more efficiently transmitted using PUCCH format 3 capable of transmitting CQI information having a large size.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Figure 1:
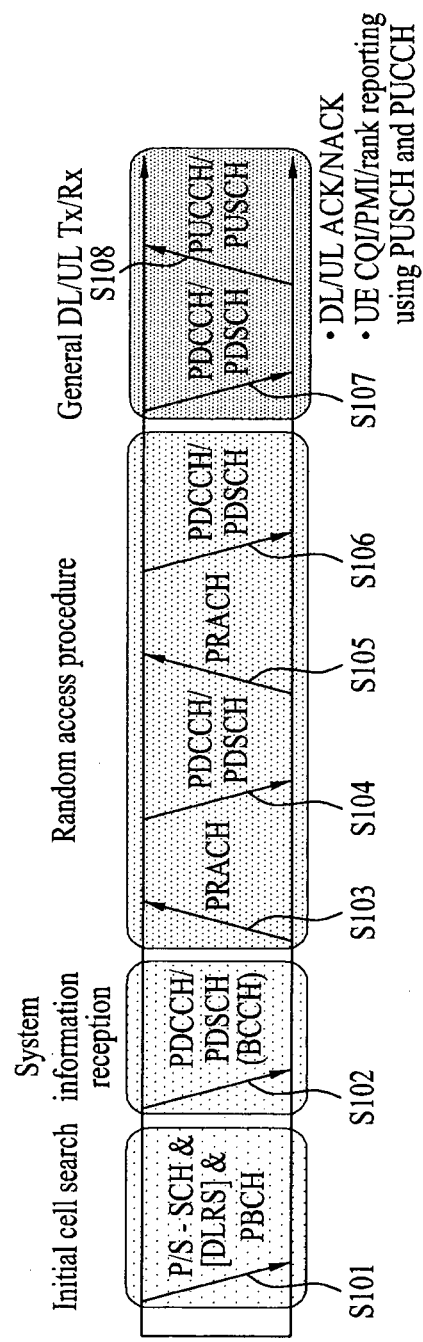
FIG. 1 is a diagram showing physical channels used in a 3GPP LTE system and a general signal transmission method using the same.

Embodiments of the present invention relate to methods of coding and transmitting uplink control information (UCI) including channel quality control information in a carrier aggregation environment (that is, a multi-component carrier environment) and apparatuses for supporting the same. In addition, embodiments of the present invention disclose various channel coding methods and Cyclic Redundancy Check (CRC) attaching methods used in the case in which UCI including Channel Quality information (CQI)/Precoding Matrix Indicator (PMI), which is channel quality control information, is transmitted through a physical uplink shared channel (PUSCH).

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), advanced base station (ABS) or access point as necessary.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213 and/or 3GPP TS 36.331, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like.

CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA).

The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

1. General 3GPP LTE/LTE_A System

In a radio communication system, a user equipment (UE) receives information from a base station (BS) in downlink (DL) and transmits information to the BS in uplink (UL). Information transmitted and received between the BS and the UE includes general data and a variety of control information and various physical channels are present according to the kind/usage of the transmitted and received information.

FIG. 1 is a view showing physical channels used for a 3$^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the eNB. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted through a PUCCH in the LTE system, it may be transmitted through a PUSCH if control information and traffic data are simultaneously transmitted. In addition, a UCI may be aperiodically transmitted via a PUSCH according to a network request/instruction.

Figure 2:
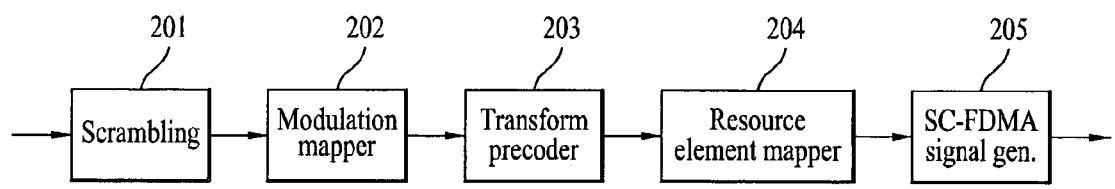
FIG. 2 is a diagram illustrating a structure of a user equipment (UE) and a signal processing procedure of transmitting an uplink signal at the UE.

FIG. 2 is a diagram illustrating a structure of a user equipment (UE) and a signal processing procedure of transmitting an uplink signal at the UE.

In order to transmit an uplink signal, a scrambling module 201 of the UE may scramble a transmitted signal using a UE-specific scrambling signal. The scrambled signal is input to a modulation mapper 202 so as to be modulated into complex symbols by a Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are processed by a transform precoder 203 and are input to a resource element mapper 204. The resource element mapper 204 may map the complex symbols to time-frequency resource elements. The processed signal may be transmitted to the BS via an SC-FDMA signal generator 205 and an antenna.

Figure 3:
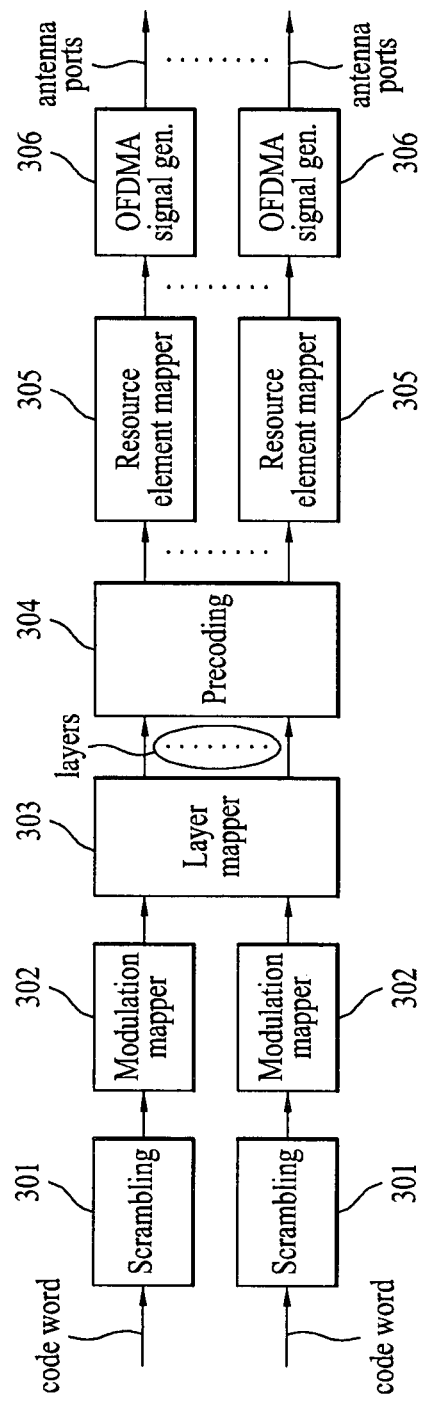
FIG. 3 is a diagram illustrating a structure of a base station and a signal processing procedure of transmitting a downlink signal at the base station.

FIG. 3 is a diagram illustrating a structure of a BS and a signal processing procedure of transmitting a downlink signal at the BS.

In a 3GPP LTE system, the BS may transmit one or more codewords in downlink. Accordingly, one or more codewords may be processed to configure complex symbols by scrambling modules 301 and modulation mappers 302, similar to the UL transmission of FIG. 2. Thereafter, the complex symbols are mapped to a plurality of layers by a layer mapper 303, and each layer may be multiplied by a precoding matrix by a precoding module 304 and may be allocated to each transmission antenna. The processed signals which will respectively be transmitted via antennas may be mapped to time-frequency resource elements by resource element mappers 305, and may respectively be transmitted via OFDM signal generators 306 and antennas.

In a wireless communication system, in a case in which a UE transmits a signal in uplink, a Peak-to-Average Ratio (PAPR) may be more problematic than the case in which a BS transmits a signal in downlink. Accordingly, as described above with reference to FIGS. 2 and 3, an OFDMA scheme is used to transmit a downlink signal, while an SC-FDMA scheme is used to transmit an uplink signal.

Figure 4:
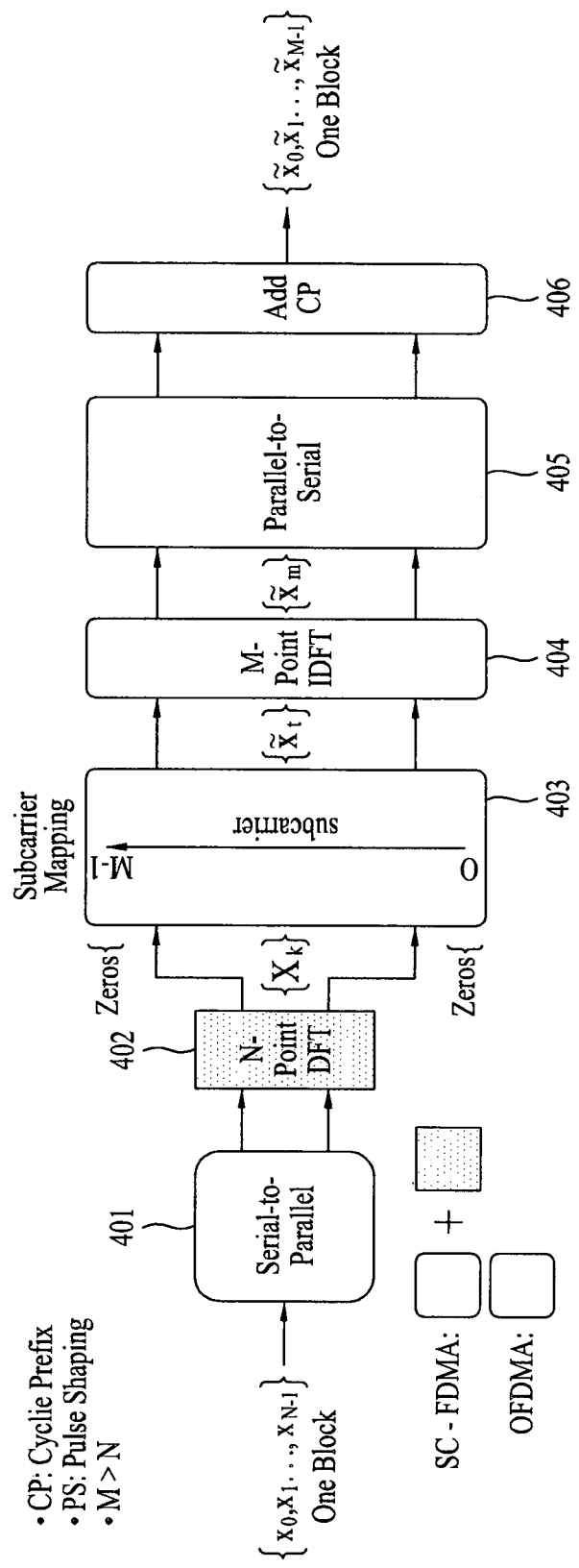
FIG. 4 is a diagram illustrating a structure of a UE, an SC-FDMA scheme and an OFDMA scheme.

FIG. 4 is a diagram illustrating a structure of a UE, an SC-FDMA scheme and an OFDMA scheme.

In the 3GPP system (e.g., the LTE system), the OFDMA scheme is used in downlink and the SC-FDMA is used in uplink. Referring to FIG. 4, a UE for uplink signal transmission and a BS for downlink signal transmission are identical in that a serial-to-parallel converter 401, a subcarrier mapper 403, an M-point Inverse Discrete Fourier Transform (IDFT) module 404 and a Cyclic Prefix (CP) attachment module 406 are included.

The UE for transmitting a signal using an SC-FDMA scheme further includes an N-point DFT module 402. The N-point DFT module 402 partially offsets an Inverse Discrete Fourier Transform (IDFT) process influence of the M-point IDFT module 404 such that the transmitted signal has a single carrier property.

Figure 5:
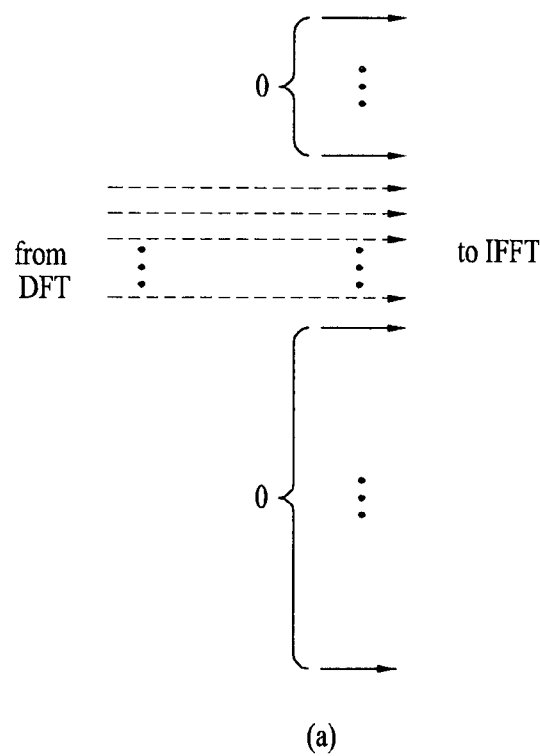
FIG. 5 is a diagram illustrating a signal mapping scheme in a frequency domain satisfying a single carrier property in the frequency domain.
Figure 5:
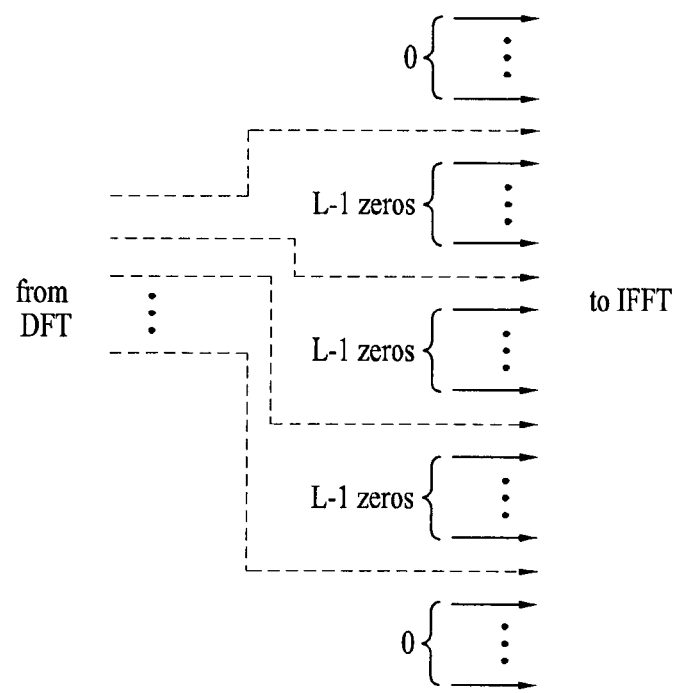

FIG. 5 is a diagram illustrating a signal mapping scheme in a frequency domain satisfying a single carrier property in the frequency domain.

FIG. 5(a) shows a localized mapping scheme and FIG. 5(b) shows a distributed mapping scheme. In a clustered SC-FDMA scheme which is a modified form of the SC-FDMA scheme, DFT process output samples are divided into sub-groups in a subcarrier mapping process and are non-contiguously mapped in the frequency domain (or subcarrier domain).

Figure 6:
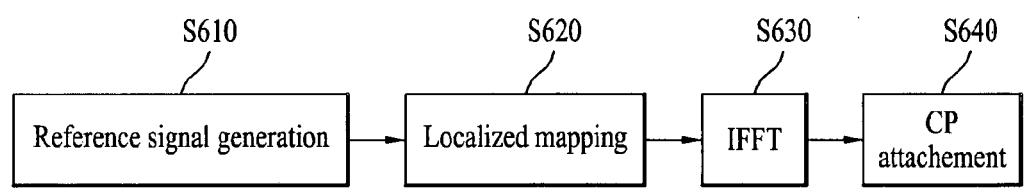
FIG. 6 is a block diagram illustrating a process of transmitting a reference signal (RS) for demodulating a transmitted signal according to an SC-FDMA scheme.

FIG. 6 is a block diagram illustrating a process of transmitting a reference signal (RS) for demodulating a transmitted signal according to an SC-FDMA scheme.

In the LTE standard (e.g., 3GPP release 8), in a data part, a signal generated in a time domain is converted into a frequency domain signal through a DFT process, is subjected to subcarrier mapping, is subjected to an IFFT process, and then is transmitted (see FIG. 4). However, an RS is immediately generated in a frequency domain without performing a DFT process (S610), is mapped to a subcarrier (S620), is subjected to an IFFT process (S630), is subjected to CP attachment (S640), and is transmitted.

Figure 7:
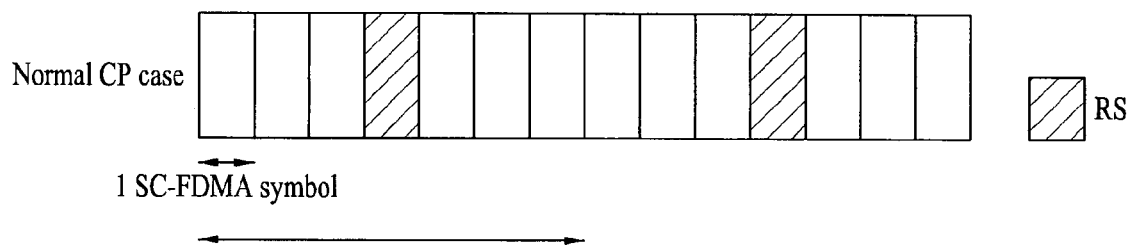
FIG. 7 is a diagram showing a position of a symbol, to which an RS is mapped, in a subframe structure according to an SC-FDMA scheme.
Figure 7:
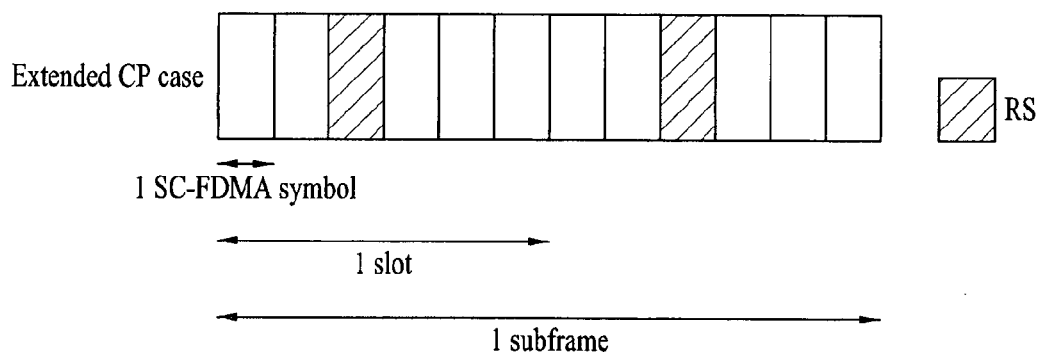

FIG. 7 is a diagram showing a position of a symbol, to which an RS is mapped, in a subframe structure according to an SC-FDMA scheme.

FIG. 7(a) shows an RS which is positioned at a fourth SC-FDMA symbol of each of two slots in one subframe in the case of a normal CP. FIG. 7(b) shows an RS which is positioned at a third SC-FDMA symbol of each of two slots in one subframe in the case of an extended CP.

Figure 8:
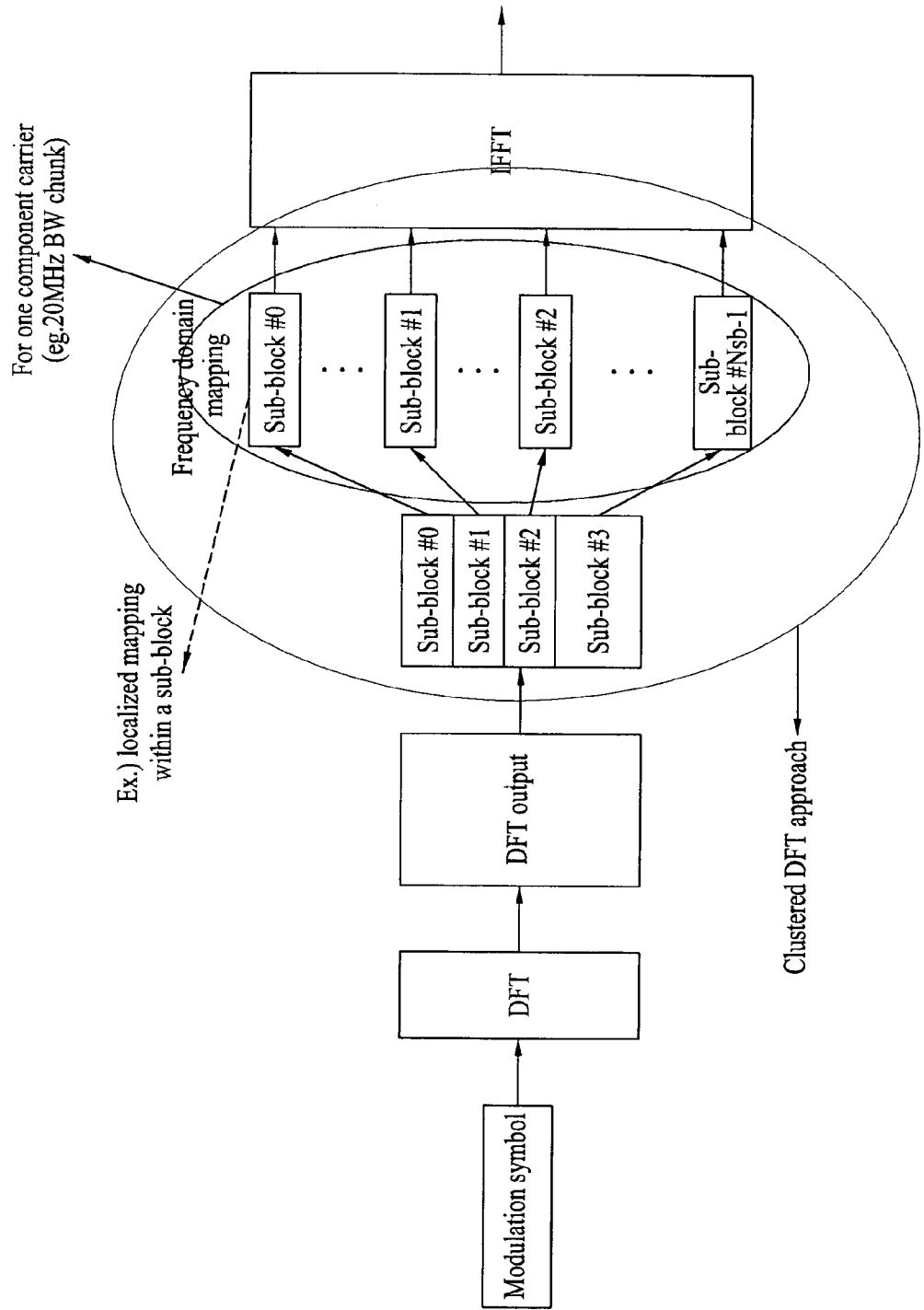
FIG. 8 is a diagram illustrating a signal processing procedure in which DFT process output samples are mapped to a single carrier in a clustered SC-FDMA scheme.
Figure 9:
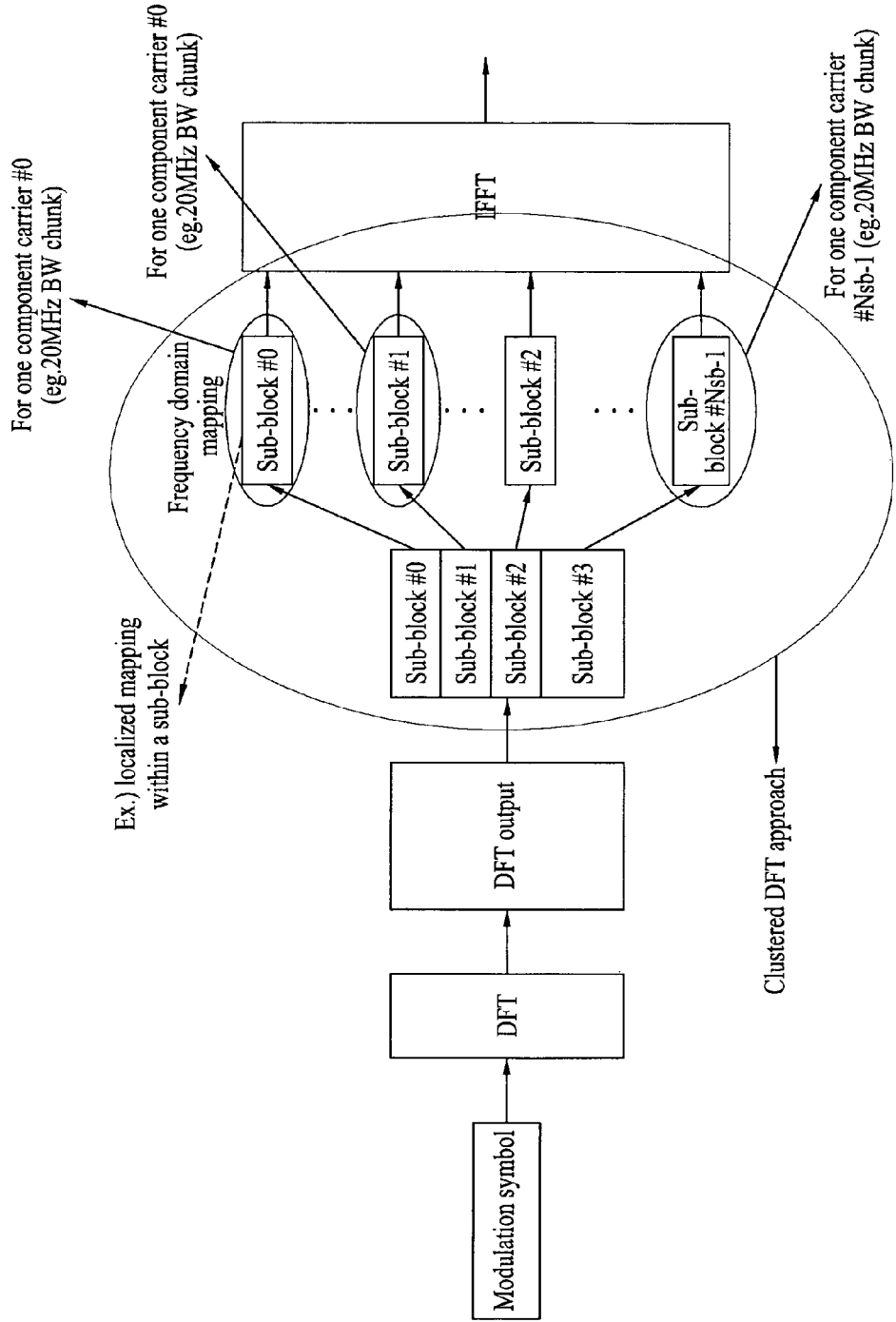
FIGS. 9 and 10 are diagrams illustrating a signal processing procedure in which DFT process output samples are mapped to multiple carriers in a clustered SC-FDMA scheme.
Figure 10:
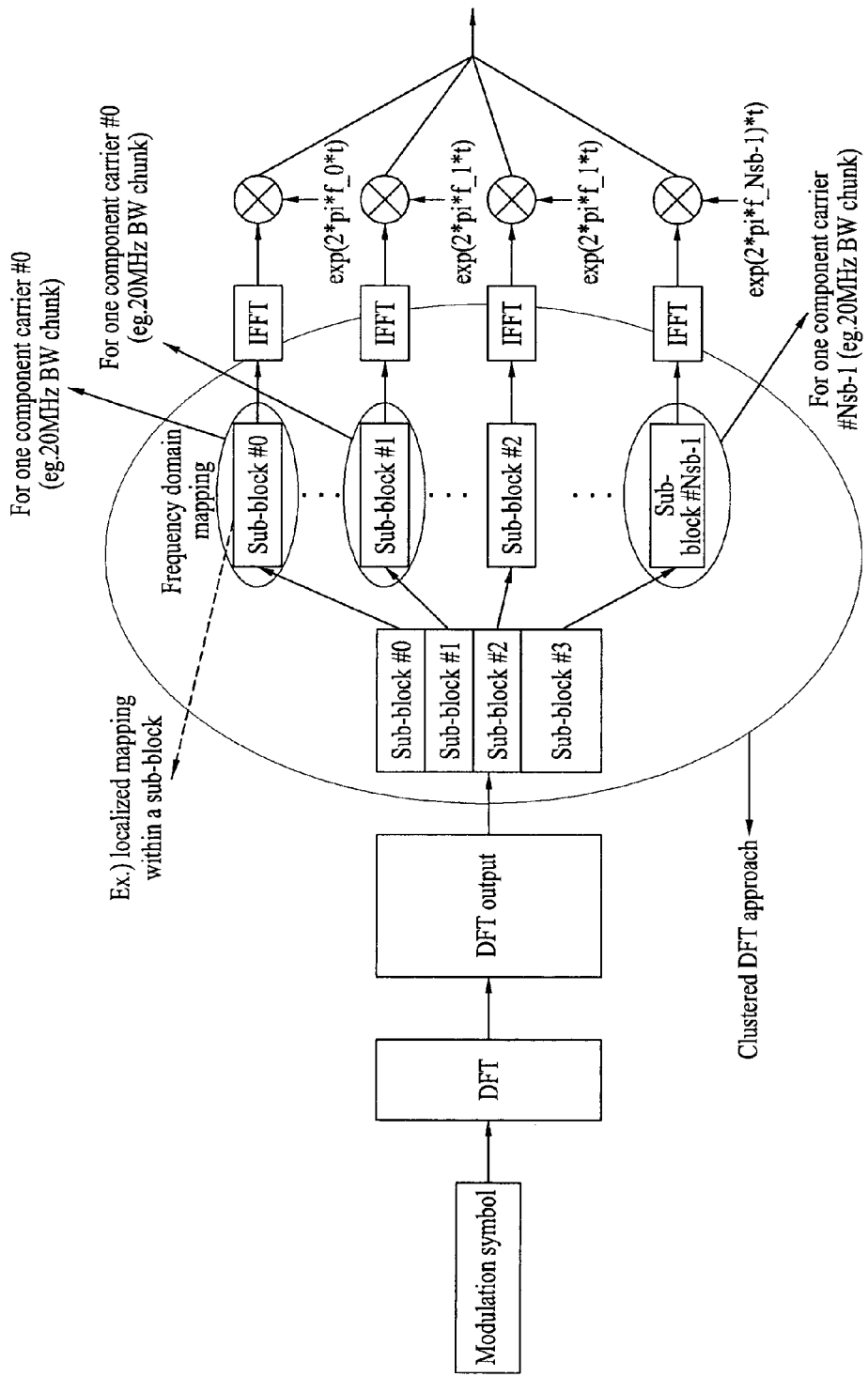

FIG. 8 is a diagram illustrating a signal processing procedure in which DFT process output samples are mapped to a single carrier in a clustered SC-FDMA scheme. FIGS. 9 and 10 are diagrams showing a signal processing procedure in which DFT process output samples are mapped to multiple carriers in a clustered SC-FDMA scheme.

FIG. 8 shows an example of applying an intra-carrier clustered SC-FDMA scheme and FIGS. 9 and 10 show examples of applying an inter-carrier clustered SC-FDMA scheme. FIG. 9 shows the case in which a subcarrier spacing between contiguous component carriers is set and a signal is generated by a single IFFT block in a state in which component carriers are contiguously allocated in a frequency domain and FIG. 10 shows the case in which a signal is generated by a plurality of IFFT blocks in a state in which component carriers are non-contiguously allocated in a frequency domain.

Figure 11:
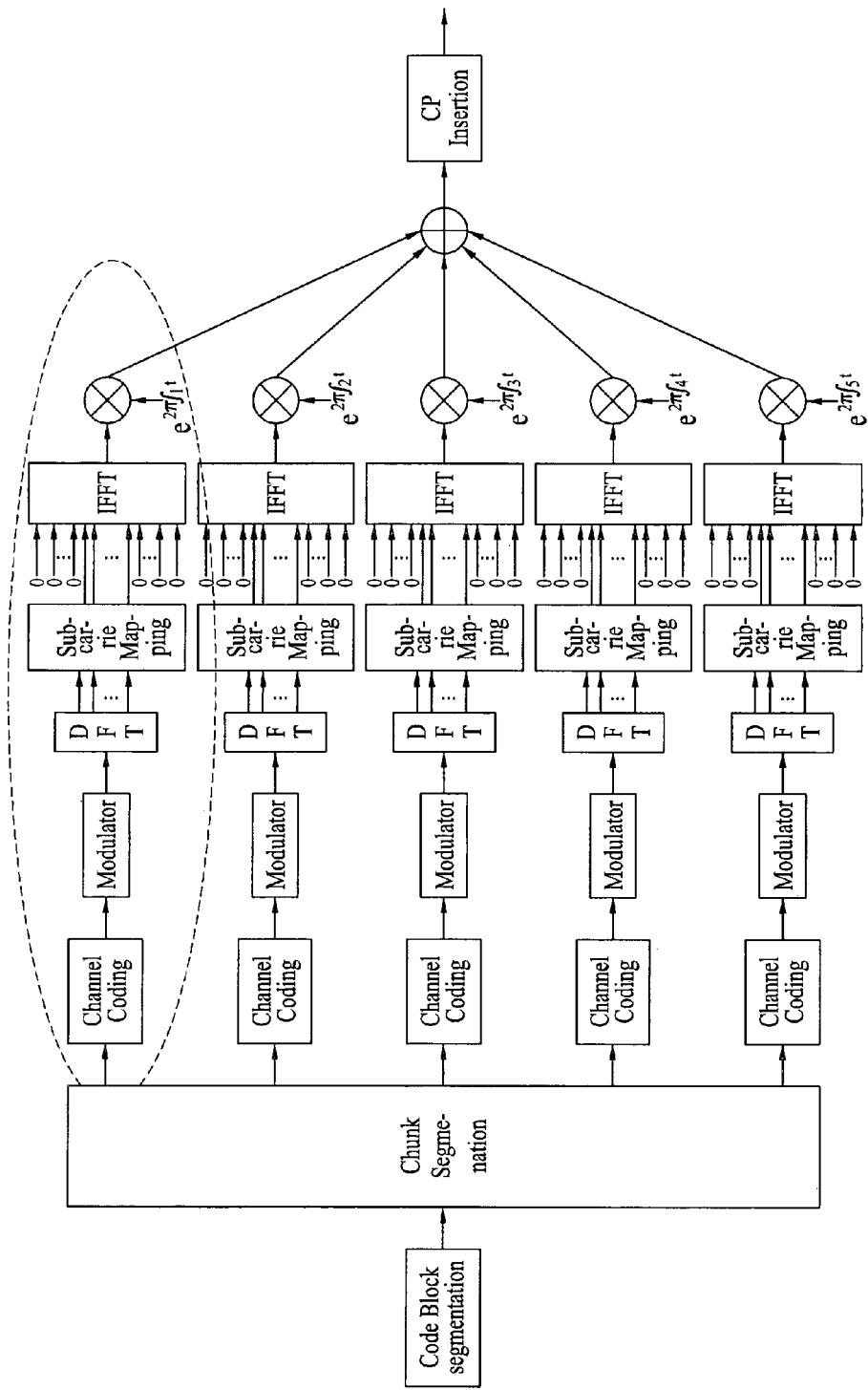
FIG. 11 is a diagram showing a signal processing procedure of a segmented SC-FDMA scheme.

FIG. 11 is a diagram showing a signal processing procedure in a segmented SC-FDMA scheme.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme is also referred to as an NxSC-FDMA or NxDFT-s-OFDMA scheme. In the present specification, the generic term "segmented SC-FDMA" is used. Referring to FIG. 11, in the segmented SC-FDMA scheme, modulation symbols of an entire time domain are grouped into N (N being an integer greater than 1) groups and a DFT process is performed on a group unit basis, in order to relax a single carrier property.

Figure 12:
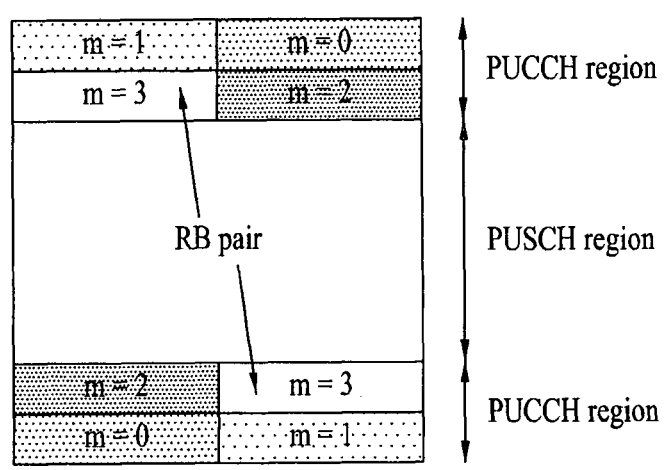
FIG. 12 is a structure of an uplink subframe which may be used in the embodiments of the present invention.

FIG. 12 is a diagram showing a structure of an uplink subframe which may be used in the embodiments of the present invention.

Referring to FIG. 12, the uplink subframe includes a plurality (e.g., two) of slots. Each slot may include SC-FDMA symbols, the number of which varies according to the length of a CP. For example, in the case of a normal CP, a slot may include seven SC-FDMA symbols.

An uplink subframe is divided into a data region and a control region. The data region is a region, in which a PUSCH is transmitted and received, and is used to transmit an uplink data signal such as voice. The control region is a region, in which a PUCCH signal is transmitted and received, and is used to transmit uplink control information.

The PUCCH includes an RB pair (e.g., m=0, 1, 2, 3) positioned at both ends of the data region on the frequency axis. The PUCCH is configured as an RB pair (e.g., an RB pair of frequency-mirrored positions) positioned at both opposite ends on the frequency axis and hops between slots. The uplink control information (that is, UCI) includes HARQ ACK/NACK, Channel Quality Information (CQI), Precoding Matrix Indicator (PMI), Rank Indication (RI), etc.

Hereinafter, a PUCCH format which may be used in the embodiments of the present invention will be described. A PUCCH signal may have the following format in order to transmit control information.

(1) PUCCH Format 1: This is used for on-off keying (OOK) modulation and scheduling request (SR).

(2) PUCCH Format 1a and Format 1b: They are used for ACK/NACK transmission.

1) PUCCH Format 1a: BPSK ACK/NACK for one codeword

2) PUCCH Format 1b: QPSK ACK/NACK for two codewords (3) PUCCH Format 2: This is used for QPSK modulation and CQI transmission.

(4) PUCCH Format 2a and Format 2b: They are used for CQI and ACK/NACK simultaneous transmission.

Table 1 shows a modulation scheme and the number of bits per subframe according to a PUCCH format. In Table 1, the PUCCH formats 2a and 2b correspond to the normal CP case.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

Table 2 shows the number of RSs per slot according to a PUCCH format.

TABLE 2

| PUCCH format | Normal CP | Extended CP |
| --- | --- | --- |
| 1, 1a, 1b | 3 | 2 |
| 2 | 2 | 1 |
| 2a, 2b | 2 | N/A |

Table 3 shows SC-FDMA symbol positions of an RS according to a PUCCH format.

TABLE 3

| PUCCH format | SC-FDMA symbol position of RS | |
| --- | --- | --- |
| | Normal CP | Extended CP |
| 1, 1a, 1b | 2, 3, 4 | 2, 3 |
| 2, 2a, 2b | 1, 5 | 3 |

Figure 13:
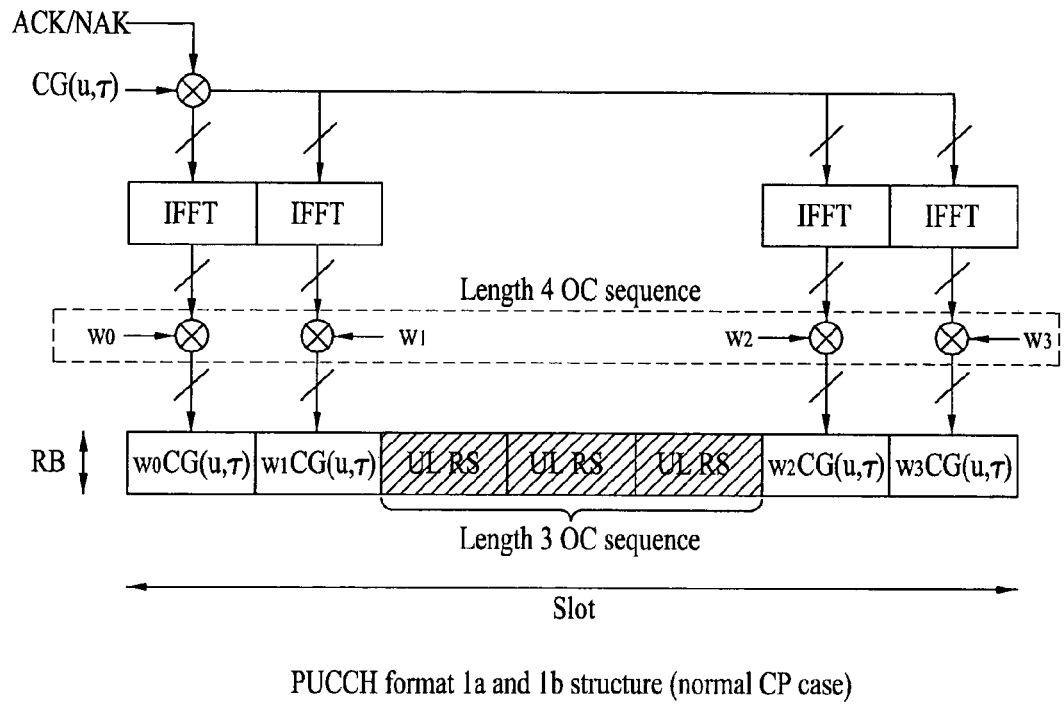
FIG. 13 is a diagram showing PUCCH formats 1a and 1b in the case of a normal cyclic prefix (CP)
Figure 14:
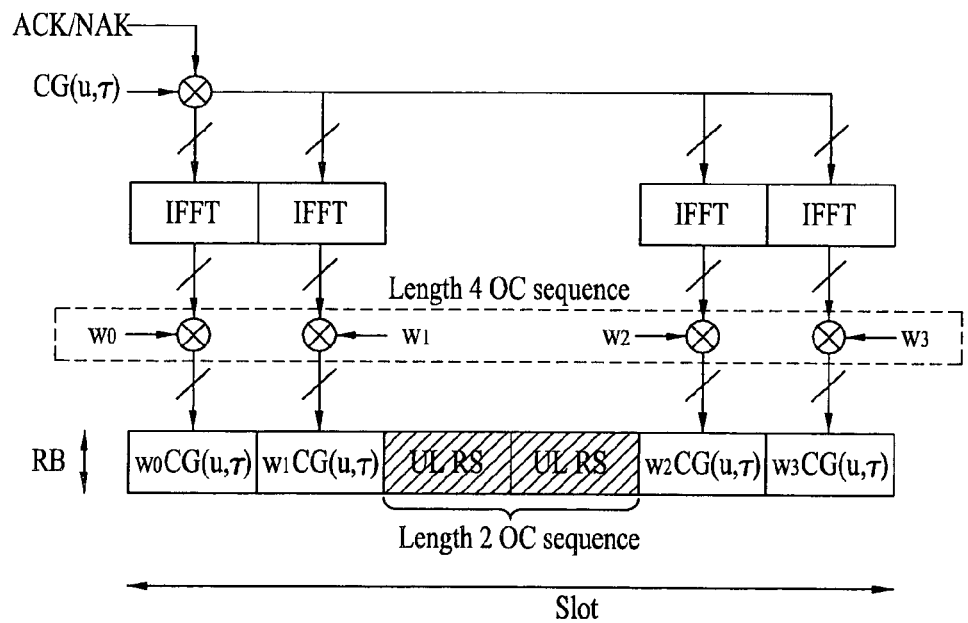
FIG. 14 is a diagram showing PUCCH formats 1a and 1b in the case of an extended CP.

FIG. 13 shows PUCCH formats 1a and 1b in the normal CP case. FIG. 14 shows PUCCH formats 1a and 1b in the extended CP case.

Referring to FIGS. 13 and 14, in the PUCCH formats 1a and 1b, the same control information is repeated within a subframe in slot units. Each UE transmits an ACK/NACK signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes).

The OC includes, for example, a Walsh/DFT orthogonal code. If the number of CSs is 6 and the number of OCs is 3, a total of 18 UEs may be multiplexed in the same physical resource block (PRB) based on a single antenna. Orthogonal sequences w0, w1, w2 and w3 may be applied in an arbitrary time domain (after FFT modulation) or an arbitrary frequency domain (before FFT modulation).

For SR and persistent scheduling, ACK/NACK resources including CSs, OCs and PRBs may be provided to a UE through radio resource control (RRC). For dynamic ACK/NACK and non-persistent scheduling, ACK/NACK resources may be implicitly provided to the UE by a lowest CCE index of a PDCCH corresponding to a PDSCH.

Figure 15:
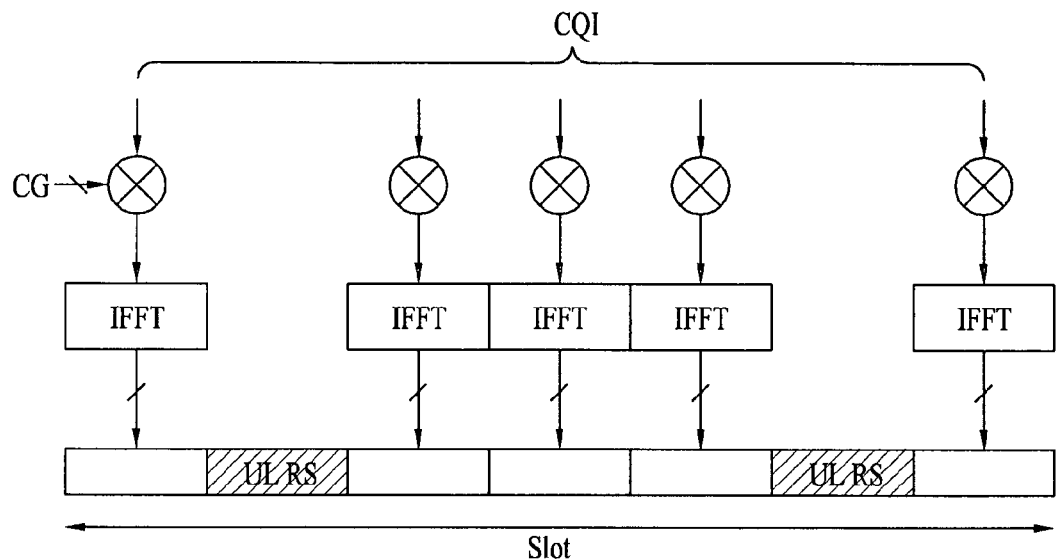
FIG. 15 is a diagram showing a PUCCH format 2/2a/2b in the case of a normal CP.
Figure 16:
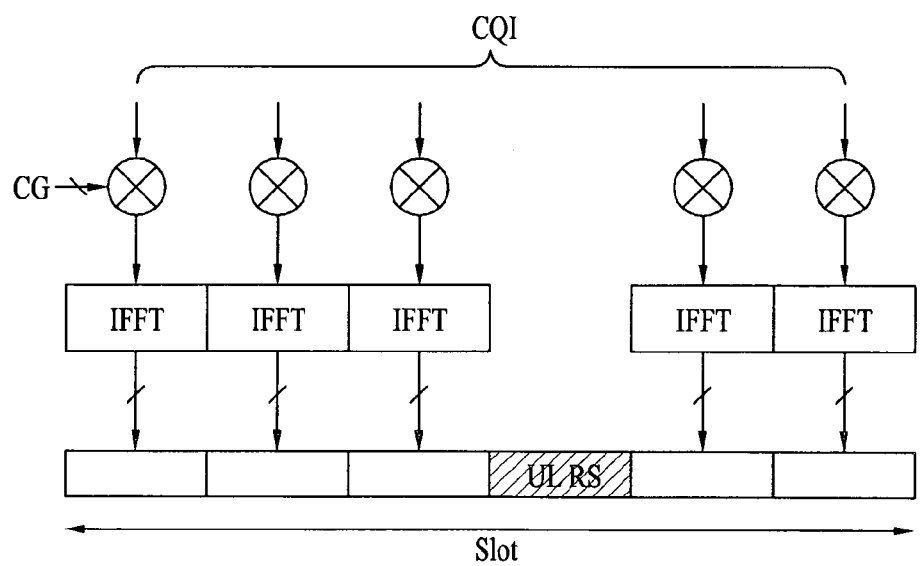
FIG. 16 is a diagram showing a PUCCH format 2/2a/2b in the case of an extended CP.

FIG. 15 shows a PUCCH format 2/2a/2b in the normal CP case. FIG. 16 shows a PUCCH format 2/2a/2b in the extended CP case.

Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following Tables 4 and 5.

TABLE 4

Length-4 orthogonal sequences for PUCCH formats 1/1a/1b

| Sequence index $n_{oc}$ ($n_s$) | Orthogonal sequences [w(0) ... w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

TABLE 5

Length-3 orthogonal sequences for PUCCH formats 1/1a/1b

| Sequence index $n_{oc}$ ($n_s$) | Orthogonal sequences [w(0) ... w($N_{SF}^{PUCCH}$ − 1)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OCs for the RS in the PUCCH formats 1/1a/1b is shown in Table 6.

TABLE 6

| | 1a and 1b | |
|---|---|---|
| Sequence index $n_{oc}$ ($n_s$) | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 17:
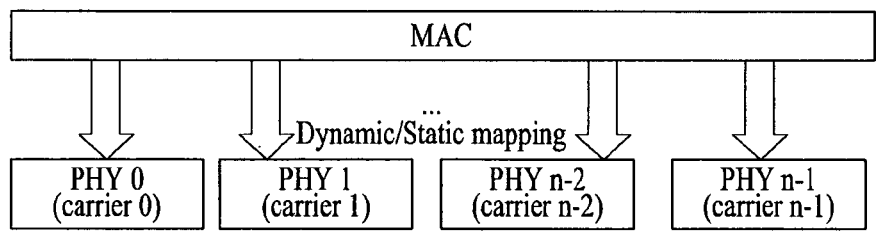
FIG. 17 is a conceptual diagram of the case in which one medium access control (MAC) layer manages multiple carriers at a base station.
Figure 18:
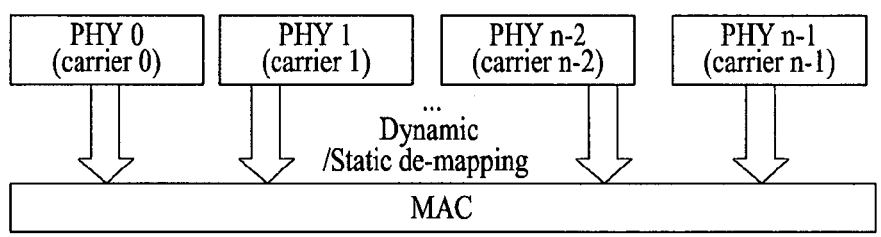
FIG. 18 is a conceptual diagram of the case in which one MAC layer manages multiple carriers at a UE.

FIG. 17 is a conceptual diagram of the case in which one medium access control (MAC) layer manages multiple carriers at a BS, and FIG. 18 is a conceptual diagram of the case in which one MAC layer manages multiple carriers at a UE.

Referring to FIGS. 17 and 18, one MAC layer manages one or more frequency carriers so as to perform transmission and reception. Since frequency carriers managed by one MAC layer do not need to be contiguous to each other, resource management is flexible.

In FIGS. 17 and 18, one physical (PHY) layer means one component carrier, for convenience. One PHY layer does not necessarily mean an independent radio frequency (RF) device. In general, one independent RF device means one PHY layer, but the present invention is not limited thereto. One RF device may include several PHY layers.

Figure 19:
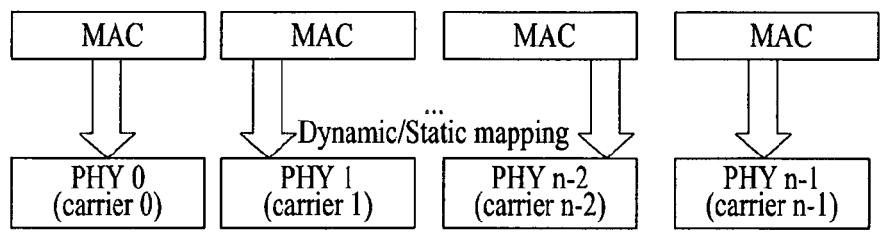
FIG. 19 is a conceptual diagram of the case in which a plurality of MAC layers manages multiple carriers at a base station.
Figure 20:
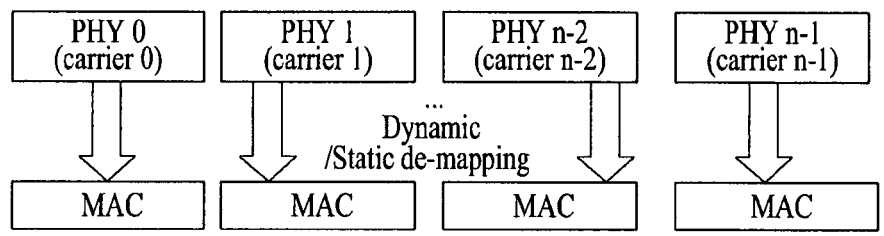
FIG. 20 is a conceptual diagram of the case in which a plurality of MAC layers manages multiple carriers at a UE.

FIG. 19 is a conceptual diagram of the case in which a plurality of MAC layers manages multiple carriers at a BS, and FIG. 20 is a conceptual diagram of the case in which a plurality of MAC layers manages multiple carriers at a UE.

Figure 21:
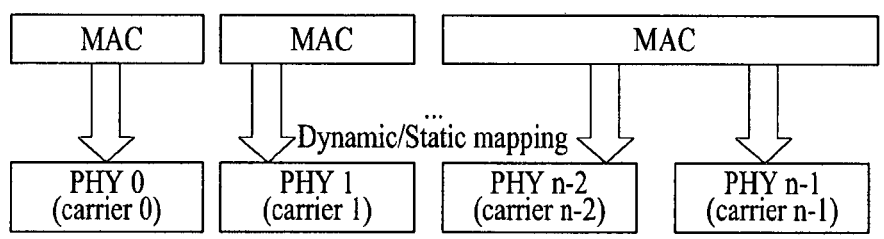
FIG. 21 is another conceptual diagram of the case in which a plurality of MAC layers manages multiple carriers at a base station.
Figure 22:
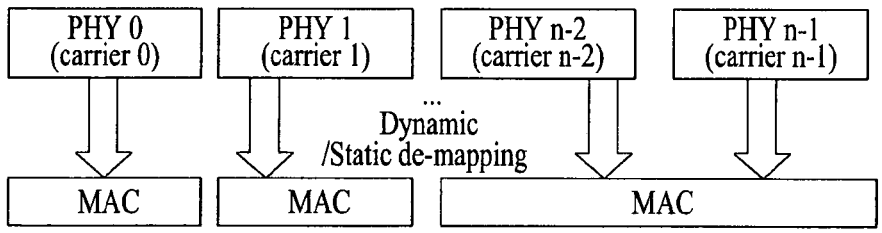
FIG. 22 is another conceptual diagram of the case in which a plurality of MAC layers manages multiple carriers at a UE.

FIG. 21 is another conceptual diagram of the case in which a plurality of MAC layers manages multiple carriers at a BS, and FIG. 22 is another conceptual diagram of the case in which a plurality of MAC layers manages multiple carriers at a UE.

In addition to the structures shown in FIGS. 17 and 18, several MAC layers may control several carriers as shown in FIGS. 19 to 22. For example, each MAC layer may control each carrier in one-to-one correspondence as shown in FIGS. 19 and 20 and each MAC layer may control each carrier in one-to-one correspondence with respect to some carriers and one MAC layer may control one or more carriers with respect to the remaining carriers as shown in FIGS. 21 and 22.

The system includes a plurality of carriers such as one carrier to N carriers and the carriers may be contiguous or non-contiguous, regardless of uplink/downlink. A TDD system is configured to manage a plurality (N) of carriers in downlink and uplink transmission. A FDD system is configured such that a plurality of carriers is used in each of uplink and downlink. In the case of the FDD system, asymmetric CA in which the numbers of carriers aggregated in uplink and downlink and/or the bandwidths of the carriers are different may be also supported.

When the numbers of aggregated component carriers in uplink and downlink are the same, it is possible to configure all component carriers so as to enable backward compatibility with the existing system. However, component carriers which do not consider compatibility are not excluded from the present invention.

Hereinafter, for convenience of description, it is assumed that, when a PDCCH is transmitted through a downlink component carrier #0, a PDSCH corresponding thereto is transmitted through a downlink component carrier #0. However, cross-carrier scheduling may be applied and the PDSCH may be transmitted through another downlink component carrier. The term "component carrier" may be replaced with other equivalent terms (e.g., cell).

Figure 23:
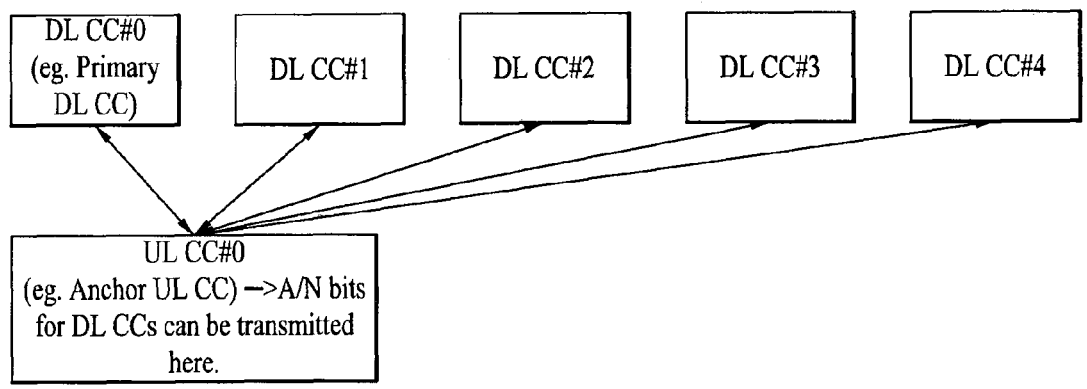
FIG. 23 is a diagram showing one method of transmitting uplink control information (UCI) in a radio communication system supporting carrier aggregation.

FIG. 23 is a diagram showing one method of transmitting uplink control information (UCI) in a wireless communication system supporting carrier aggregation (CA).

In FIG. 23, for convenience, it is assumed that the UCI is ACK/NACK (A/N). The UCI may include control information channel state information (e.g., CQI, PMI, RI, etc.) or scheduling request information (e.g., SR, etc.), without limitation.

FIG. 23 is a diagram showing asymmetric CA in which five downlink (DL) CCs and one uplink (UL) CC are linked. The shown asymmetric CA is set from the viewpoint of UCI transmission. That is, a DL CC-UL CC linkage for UCI and a DL CC-UL CC linkage for data are differently set. For convenience, if it is assumed that one DL CC may transmit a maximum of two codewords, the number of UL ACK/NACK bits is at least two. In this case, in order to transmit ACK/ NACK for data, which is received through five DL CCs, through one UL CC, ACK/NACK of at least 10 bits is necessary.

In order to support a DTX state of each DL CC, at least 12 bits ($=5^5=3125=11.61$ bits) are necessary for ACK/NACK transmission. Since ACK/NACK of up to 2 bits may be transmitted in the existing PUCCH formats 1a/1b, such a structure cannot transmit extended ACK/NACK information. For convenience, although an example in which the amount of UCI information is increased due to CA is described, the amount of UCI information may be increased due to the increase in the number of antennas, existence of a backhaul subframe in a TDD system and a relay system, etc. Similarly to ACK/ NACK, even when control information associated with a plurality of DL CCs is transmitted through one UL CC, the amount of control information to be transmitted is increased. For example, in the case in which a CQI/PMI/RI for a plurality of DL CCs must be transmitted, UCI payload may be increased.

2. Multi-Carrier Aggregation Environment

A communication environment considered in the embodiments of the present invention includes all multi-carrier supporting environments. That is, a multi-carrier system or a multi-carrier aggregation system used in the present invention refers to a system for aggregating and utilizing one or more component carriers (CCs) having a bandwidth smaller than a target bandwidth, in order to support a target wide band.

In the present invention, multi-carrier refers to CA. CA includes both aggregation of contiguous carriers and aggregation of non-contiguous carriers. In addition, CA may be used interchangeably with the term "bandwidth aggregation".

Multi-carrier (that is, carrier aggregation) configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system.

For example, the existing LTE system may support bandwidths of 1.4, 3, 5, 10, 15 and 20 MHz and an $LTE_{Advanced}$ ($LTE$-A) system evolved from the LTE system may support a bandwidth greater than 20 MHz using only the bandwidths supported by the LTE system. Alternatively, the multi-carrier system used in the present invention may define a new bandwidth so as to support CA, regardless of the bandwidths used in the existing system.

The LTE-A system uses the concept of a cell in order to manage radio resources. The cell is defined as a combination of downlink resources and uplink resources, and the uplink resources are not mandatory. Accordingly, the cell may be composed of downlink resources alone or both downlink resources and uplink resources. If multi-carrier (that is, carrier aggregation) is supported, linkage between a carrier frequency (or a DL CC) of downlink resources and a carrier frequency (or a UL CC) of uplink resources may be indicated by a system information block (SIB).

A cell used in the LTE-A system includes a primary cell (PCell) and a secondary cell (SCell). The PCell refers to a cell operating on a primary frequency (e.g., a primary CC (PCC)) and the SCell refers to a cell operating on a secondary frequency (e.g., a secondary CC (SCC)). Only one PCell may be allocated to a specific UE and one or more SCells may be allocated to the specific UE.

The PCell is used to perform an initial connection establishment process or a connection re-establishment process at a UE. The PCell may be referred to as a cell indicated in a handover process. The SCell may be configured after radio resource control (RRC) connection establishment and may be used to provide additional radio resources.

The PCell and the SCell may be used as a serving cell. In the case of a UE which is in an RRC_connected state but in which CA is not set or a UE which does not support CA, one serving cell composed of only a PCell is present. In contrast, in the case of a UE which is in an RRC_connected state and in which CA is set, one or more serving cells may be present and all the serving cells include a PCell and one or more SCells.

After an initial security activation process begins, an E-UT-RAN may configure a network which comprises a PCell that is initially configured in a connection establishment process and one or more SCells. In a multi-carrier environment, the PCell and the SCell may operate as respective CCs. That is, multi-carrier aggregation may be understood as being a combination of a PCell and one or more SCells. In the following embodiments, a primary CC (PCC) may be used as the same meaning as the PCell and a secondary CC (SCC) may be used as the meaning as the SCell.

3. Method of Transmitting Control Information Using PUCCH Format 3 (CA PUCCH Format)

Hereinafter, various methods of efficiently transmitting increased uplink control information will be described with reference to the drawings. More specifically, a new PUCCH format/signal processing procedure/resource allocation method for transmitting increased uplink control information is proposed. For description, the new PUCCH format proposed by the present invention is referred to as PUCCH format 3 (or CA PUCCH format) from the viewpoint that up to the LTE-A PUCCH format or PUCCH format 2 is defined in the existing LTE (Rel-8).

The technical features of PUCCH format 3 proposed by the present invention are applicable to an arbitrary physical channel (e.g., a PUSCH) for transmitting uplink control information using the same or similar scheme. For example, the embodiments of the present invention are applicable to a periodic PUSCH structure for periodically transmitting control information or an aperiodic PUSCH structure for aperiodically transmitting control information.

The following drawings and embodiments will be described based on the case in which a UCI/RS symbol structure of PUCCH format 1 (normal CP) of the existing LTE is used as a UCI/RS symbol structure of a subframe/slot level applied to PUCCH format 3. The UCI/RS symbol structure of the subframe/slot level in the shown PUCCH format 3 is defined for convenience and the present invention is not limited to a specific structure and may be broadly applied. In PUCCH format 3 according to the present invention, the number and positions of UCI/RS symbols may be freely changed according to system design. For example, PUCCH format 3 according to the embodiment of the present invention may be defined using an RS symbol structure of PUCCH format 2/2a/2b of the existing LTE.

PUCCH format 3 according to the embodiment of the present invention may be used to transmit uplink control information of an arbitrary kind and/or size. For example, PUCCH format 3 according to the embodiment of the present invention can transmit information, such as HARQ ACK/ NACK, CQI, PMI, RI and/or SR, which may carry a payload having an arbitrary size.

Figure 24:
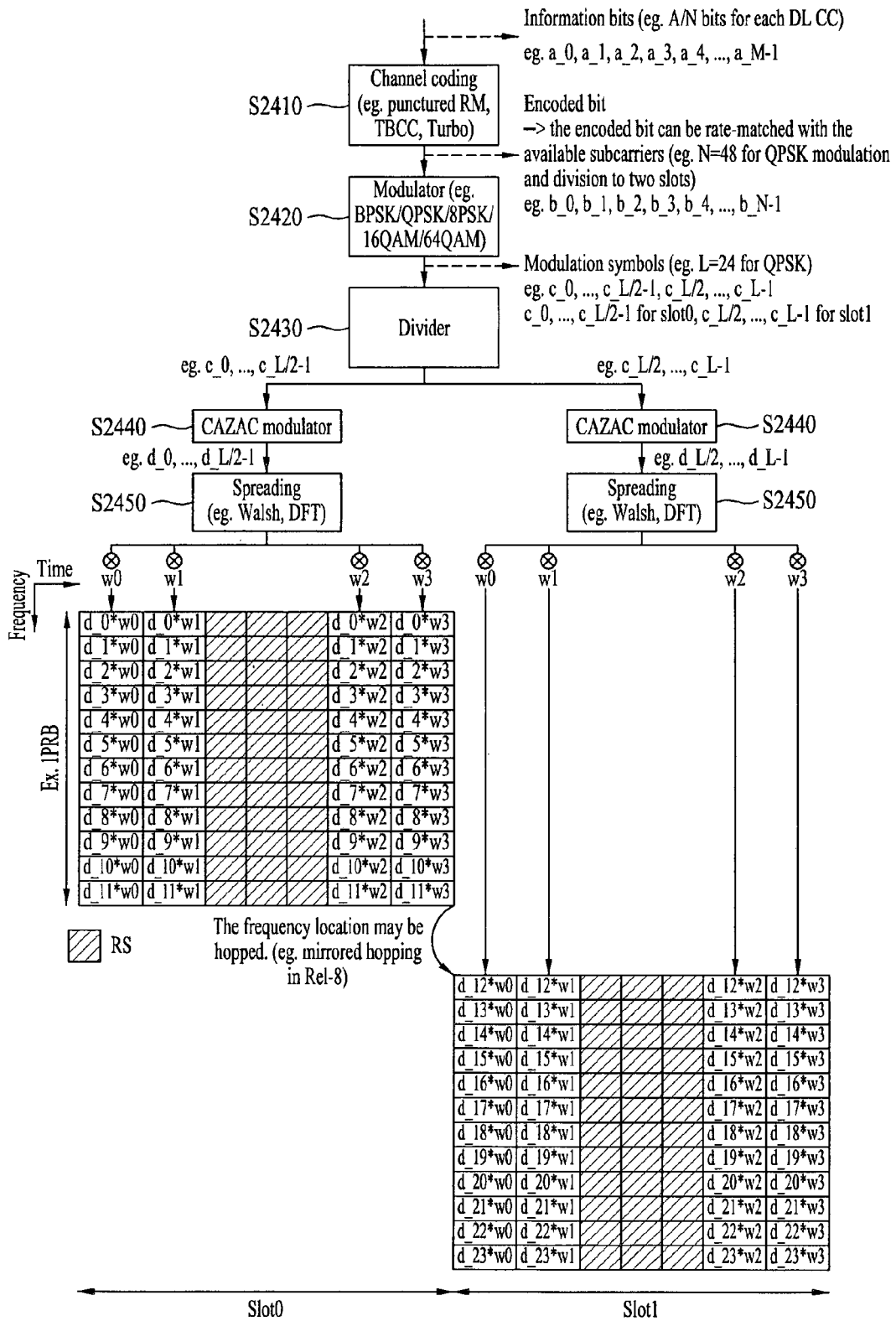
FIG. 24 is a diagram illustrating an example of a structure of PUCCH format 3 according to an embodiment of the present invention and a signal processing procedure therefor.

FIG. 24 is a diagram illustrating an example of a structure of PUCCH format 3 according to an embodiment of the present invention and a signal processing procedure therefor.

Referring to FIG. 24, a channel coding block performs channel coding with respect to information bits a_0, a_1, ..., and a_M−1 (e.g., multiple ACK/NACK bits) of uplink control information and generates encoded bits (coded bits or coding bits) (or codewords) b_0, b_1, ..., and b_N−1 (S2410).

In step S2410, M denotes the size of the information bits and N denotes the size of the encoded bits. The information bits include uplink control information (UCI), for example, multiple ACK/NACK bits for a plurality data (or PDSCHs) received through a plurality of DL CCs. The information bits a_0, a_1, ..., and a_M−1 are joint-coded regardless of the kind/number/size of UCI configuring the information bits.

For example, if the information bits include multiple ACK/NACK bits for a plurality of DL CCs, channel coding is performed not with respect to each DL CC or each ACK/NACK bit, but with respect to entire bit information. Thus, a single codeword is generated. Channel coding is not limited thereto and includes simplex repetition, simplex coding, Reed Muller (RM) coding, punctured RM coding, tail-biting convolutional coding (TBCC), low-density parity-check (LDPC) and turbo-coding.

Although not shown in FIG. 24, the encoded bits may be subjected to rate matching in consideration of a modulation order and the amount of resources. The rate matching function may be included in the channel coding block or may be performed using a separate functional block. For example, the channel coding block may perform (32, 0) RM coding with respect to a plurality of control information so as to obtain a single codeword and perform circular buffer rate matching.

A modulator modulates the encoded bits b_0, b_1, ..., and b_N−1 which are outputted from the channel coding block and generates modulation symbols c_0, c_1, ..., and c_L−1 (S2420).

In step S2420, L denotes the size of the modulation symbols. The modulation method is performed by changing the size and phase of the transmitted signal. The modulation method includes, for example, n-phase shift keying (PSK) and n-quadrature amplitude modulation (QAM) (n being an integer equal to or greater than 2). More specifically, the modulation method may include binary PSK (BPSK), quadrature PSK (QPSK), 8-PSK, QAM, 16-QAM, 64-QAM, etc.

A divider divides the modulation symbols (or, codeword) c_0, c_1, ..., and c_L−1 to each of slots (S2430).

The order/pattern/method of dividing the modulation symbols to each of slots in step S2430 is not specially limited. For example, the divider may sequentially divide the modulation symbols to slots from the front side (local type). In this case, as shown, the modulation symbols c_0, c_1, ..., and c_L/2−1 may be divided to a slot 0 and the modulation symbols c_L/2, c_L/2+1, ..., and c_L−1 may be divided to a slot 1. The modulation symbols may be interleaved (or permutated) when being divided into the slots. For example, even-numbered modulation symbols may be divided into the slot 0 and odd-numbered modulation symbols may be divided into the slot 1. The order of the modulation process and the division process may be changed.

Referring to FIG. 24, a CAZAC modulator configured per slot modulates the modulation symbols [c_0, C_1, ..., and c_L/2−1] and [c_L/2, c_L/2+1, ..., and c_L−1] divided to the slots with a corresponding sequence and generates CAZAC modulation symbols [d_0, d_1, ..., and d_L/2−1] and [d_l/2, d_L/2+1, ..., and d_L−1] (S2440).

At this time, the CAZAC modulator includes, for example, a CAZAC sequence or sequences for LTE computer generated (CG) 1RB. For example, if the LTE CG sequence is r_0, ..., and r_L/2−1, the CAZAC modulation symbols may be d_n=c_n*r_n or d_n=conj(c_n)*r_n. Although FIG. 24 shows the case of performing joint coding with a slot-level, the present invention is equally applicable to the case in which separate coding per slot, slot level repetition or frequency factor is applied.

In the embodiment disclosed in FIG. 24, since a CAZAC or CG sequence functioning as a basic sequence is already cell-specific, cell-specific scrambling may be omitted. Alternatively, only UE-specific scrambling may be applied for randomization.

Thereafter, a spreading block spreads a signal subjected to DFT at an SC-FDMA symbol level (time domain). Time domain spreading at the SC-FDMA symbol level is performed using a spreading code (sequence) (S2450).

In step S2450, the spreading code includes a quasi-orthogonal code and an orthogonal code. The quasi-orthogonal code includes a pseudo noise (PN) code. The orthogonal code may include a Walsh code and/or a DFT code. Although the orthogonal code is described as a representative example of the spreading code for ease of description in the present specification, the orthogonal code is only exemplary and may be replaced with a quasi-orthogonal code.

A maximum value of a spreading code size (or a spreading factor (SF)) is restricted by the number of SC-FDMA symbols used to transmit control information. For example, in the case in which four SC-FDMA symbols are used to transmit control information in one slot, (quasi-)orthogonal codes w0, w1, w2 and w3 having a length of 4 may be used in each slot. The SF means the spreading degree of the control information and may be associated with the multiplexing order of a UE or the multiplexing order of an antenna. The SF may be changed to 1, 2, 3, 4, ... according to system requirements and may be defined between a BS and a UE in advance or may be sent to the UE through DCI or RRC signaling. For example, in the case in which one of SC-FDMA symbols for control information is punctured in order to transmit an SRS, a spreading code with a smaller SF (e.g., SF=3 instead of SF=4) may be applied to the control information of the slot.

The signal generated through the above procedure is mapped to subcarriers within a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, the procedure described with reference to FIG. 24 will be described in detail. In the case in which each DL CC may transmit two PDSCHs, the number of ACK/NACK bits may be 12 if a DTX state is included. In the case of assuming QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 CAZAC symbols by a 12-point DFT operation. In each slot, 12 CAZAC symbols are spread and mapped to four SC-FDMA symbols using the spreading code having SF=4 in a time domain. Since 12 bits are transmitted through [2 bits*12 subcarriers+8 SC-FDMA symbols], the coding rate is 0.0625 (=12/192). In case of SF=4, a maximum of four UEs may be multiplexed per PRB.

Figure 25:
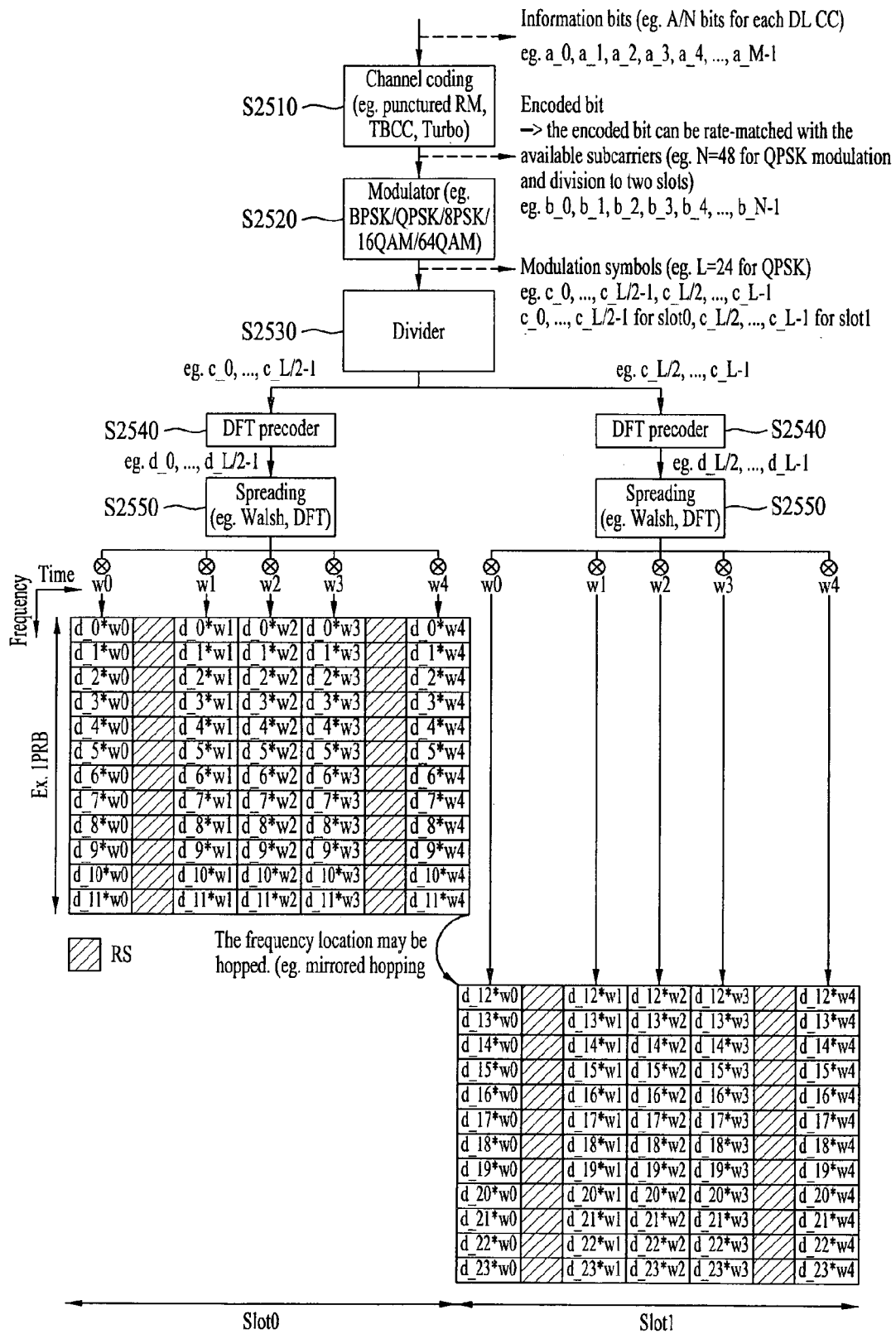
FIG. 25 is a diagram illustrating another example of a structure of PUCCH format 3 according to an embodiment of the present invention and a signal processing procedure therefor.

FIG. 25 is a diagram illustrating another example of a structure of PUCCH format 3 according to an embodiment of the present invention and a signal processing procedure therefor.

FIG. 25 is different from FIG. 24 in that step S2440 is changed to step S2540. For the other steps, refer to the description of FIG. 24. Referring to FIG. 25, the modulation symbols divided by the divider in step S2530 are input to a DFT precoder.

The DFT precoder performs DFT precoding (e.g., 12-point DFT) with respect to the modulation symbols to the slots, in order to generate a single carrier waveform. Referring to FIG. 25, the modulation symbols c_0, c_1, . . . , and c_L/2−1 divided to the slot 0 are DFT-precoded to DFT symbols d_0, d_1, . . . , and d_L/2−1 and the modulation symbols c_L/2, c_L/2+1, and . . . , c_L−1 divided to the slot 1 are DFT-precoded to DFT symbols d_L/2, d_L/2+1, . . . , and d_L−1 (S2540).

In step S2540, DFT precoding may be replaced with another linear operation (e.g., Walsh precoding).

In FIG. 25, since a data part has an SF of 5, a multiplexing capacity thereof is 5. A multiplexing capacity of an RS part is determined according to cyclic shift (CS) interval $\Delta_{shift}^{PUCCH}$. That is, the multiplexing capacity of the RS part is $$\frac{12}{\Delta_{shift}^{PUCCH}}.$$

For example, multiplexing capacities are 12, 6 and 4 in the case in which $\Delta_{shift}^{PUCCH}$ is 1, 2 or 3, respectively.

Figure 26:
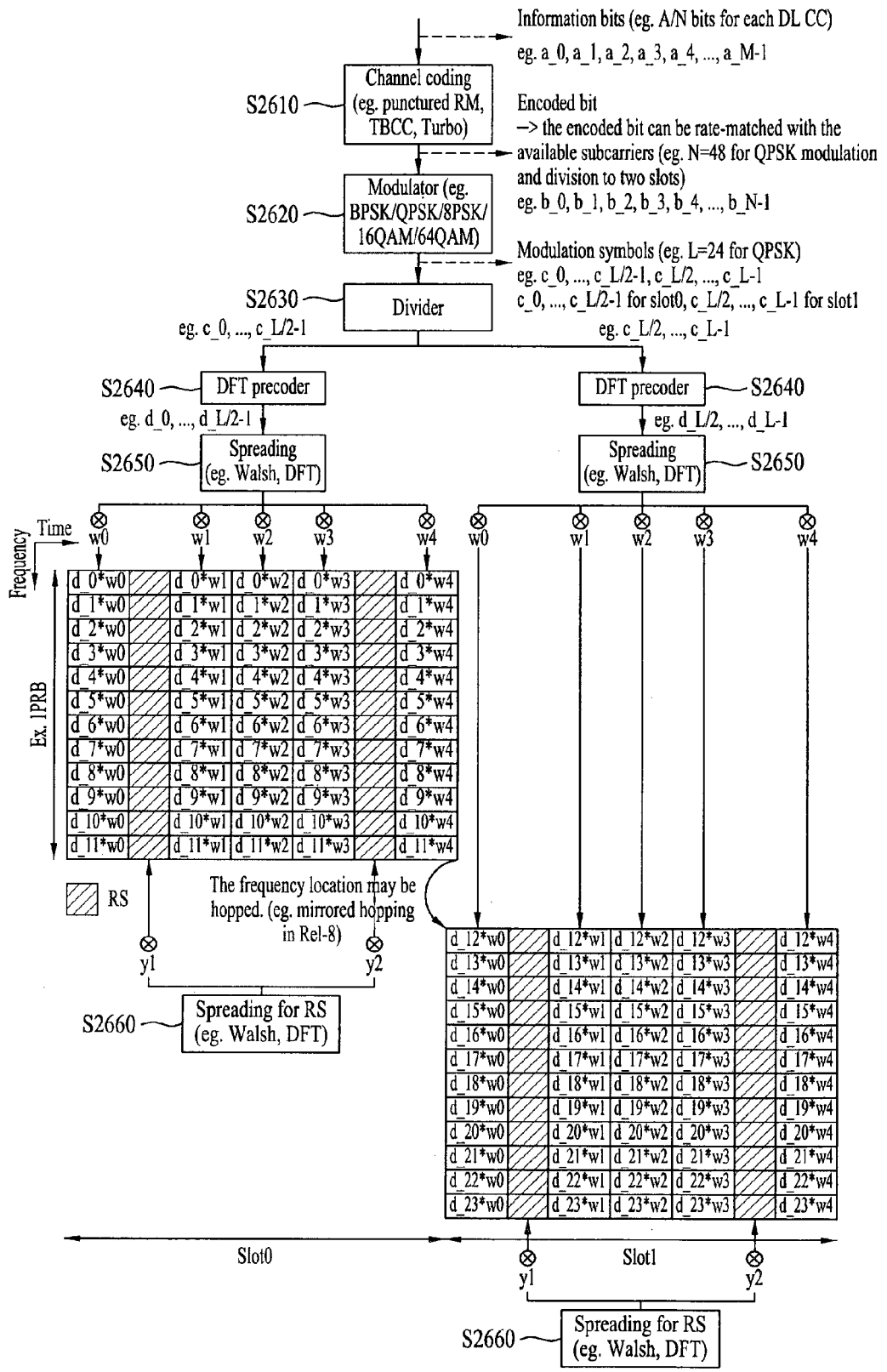
FIG. 26 is a diagram illustrating another example of a structure of PUCCH format 3 according to an embodiment of the present invention and a signal processing procedure therefor.

FIG. 26 is a diagram illustrating another example of a structure of PUCCH format 3 according to an embodiment of the present invention and a signal processing procedure therefor.

For description of the steps of FIG. 26, refer to FIGS. 24 and 25. In particular, FIG. 26 shows the method having the same structure as FIG. 25 except that step S2660 of applying SF-FDMA symbol level spreading for an RS at a slot level is performed after step S2650 of spreading the modulation symbols.

In FIG. 25, the multiplexing capacity of the data part is 5 due to SF=5 and the multiplexing capacity of the RS part is 4 in the case in which $\Delta_{shift}^{PUCCH}$ is 3. Thus, the total multiplexing capacity is set to 4 which is the smaller capacity of the two multiplexing capacities. Accordingly, as shown in FIG. 26, the above-described SC-FDMA symbol level spreading may be applied to the RS part in step S2660, thereby increasing the total multiplexing capacity.

For example, in the PUCCH format 3 structure of FIG. 26, if a Walsh cover (or a DFT code cover) is applied to a slot, the multiplexing capacity doubles. That is, even in the case in which $\Delta_{shift}^{PUCCH}$ is 3, the multiplexing capacity is 8 and the multiplexing capacity of the data part may not be lost.

At this time, as an orthogonal code cover (OCC) for an RS, a Walsh cover of [y1 y2]=[1 1], [y1 y2]=[1 −] or a linearly transformed form thereof may be used.

Figure 27:
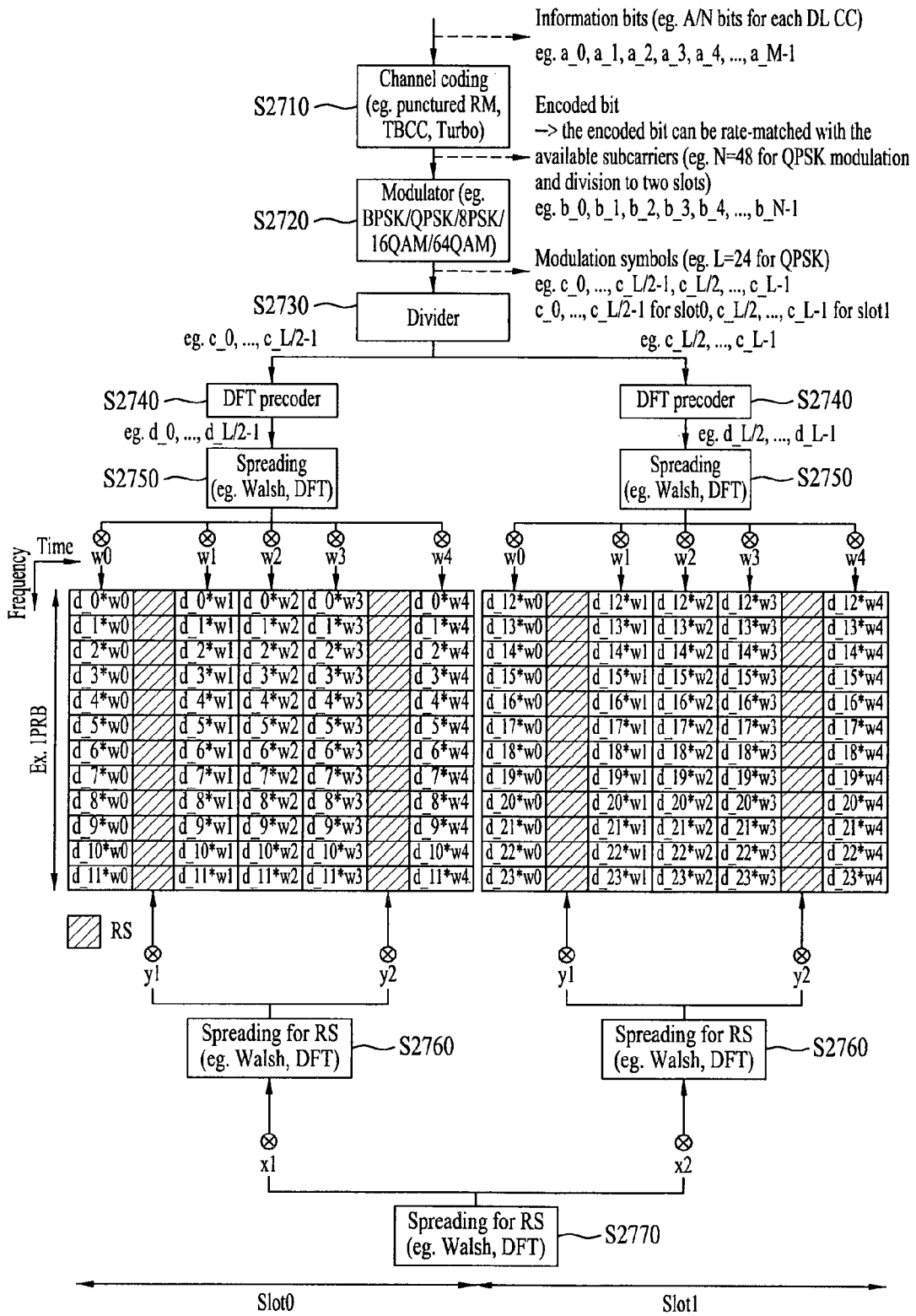
FIG. 27 is a diagram illustrating another example of a structure of PUCCH format 3 according to an embodiment of the present invention and a signal processing procedure therefor.

FIG. 27 is a diagram illustrating another example of a structure of PUCCH format 3 according to an embodiment of the present invention and a signal processing procedure therefor.

For description of the steps of FIG. 27, refer to FIGS. 24 and 25. FIG. 27 is different from FIG. 25 in that a slot-level frequency hopping operation is not performed.

Referring to FIG. 27, a spreading block spreads signals (e.g., d_0, . . . , and d_L/2−1; d_L/2, . . . , and d_L−1) subjected to DFT in steps S2710 to S2740 at an SC-FDMA symbol level (time domain). Time domain spreading at the SC-FDMA symbol level is performed using a spreading code (sequence) (S2750).

In FIG. 27, the slot-level frequency hopping operation is not performed in step S2750, and, if a Walsh cover (or a DFT code cover) is applied to each slot, a multiplexing capacity may double (S2760).

In step S2760, as an orthogonal code cover (OCC) for an RS, a Walsh cover of [y1 y2]=[1 1], [y1 y2]=[1 −1] or a linearly transformed form thereof may be used.

Thereafter, a Walsh cover may be applied at a symbol level again such that a multiplexing capacity doubles. At this time, as an orthogonal code cover (OCC) for an RS, Walsh cover of [x1 x2]=[1 1], [x1 x2]=[1 −1] or a linearly transformed form thereof may be used (S2770).

4. Channel Coding Method of Channel Quality Control Information.

Hereinafter, CQI of channel quality control information will be focused upon. The embodiments of the present invention are applicable to PMI in addition to CQI. In addition, a payload size and a channel coding scheme of CQI which may be used in the embodiments of the present invention in the case in which the CQI is transmitted using PUCCH format 3 will now be described.

4.1 CQI Payload Size Determination Method 4.1.1 In the case in which CQI is transmitted using PUCCH format 3, a maximum payload size of CQI information bits may be 20 bits.

4.1.2 In the case in which CQI is transmitted using PUCCH format 3, a maximum payload size of CQI information bits may be 21 bits.

4.1.3 In the case in which CQI is transmitted using PUCCH format 3, a maximum payload size of CQI information bits may be 16 bits.

4.2 Channel Coding Scheme Selection Method

In the embodiments of the present invention, various channel coding schemes may be used. In the LTE system and the LTE-A system, a (20, A) RM code used to transmit a PUCCH signal, a (32, O) RM code used to transmit a PUSCH signal, a dual RM code using two (20, A) RM codes, a Tail Biting Convolutional Code (TBCC), etc.

Table 7 shows a basic sequence structure of the (20, A) RM code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |

TABLE 7-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

In the embodiments of the present invention, bits channel-coded using the (20, A) RM code are $b_0, b_1, b_2, b_3, \ldots, b_{B-1}$, and B is 20. The channel-coded bits may be obtained from Equation 1. In Equation 1, i=0, 1, 2, ..., and B−1.

$$b_i = \sum_{n=0}^{A-1} (a_n \cdot M_{i,n}) \bmod 2 \qquad \text{Equation 1}$$

Table 8 shows a basic sequence structure of the (32, O) RM code.

In the embodiments of the present invention, bits channel-coded using the (32, O) RM code are $b_0, b_1, b_2, b_3, \ldots, b_{B-1}$ and B is 32 The channel-coded bits may be obtained from Equation 2. In Equation 2, i=0, 1, 2, ..., and B−1.

$$b_i = \sum_{n=0}^{O-1} (o_n \cdot M_{i,n}) \bmod 2 \qquad \text{Equation 2}$$

Figure 28:
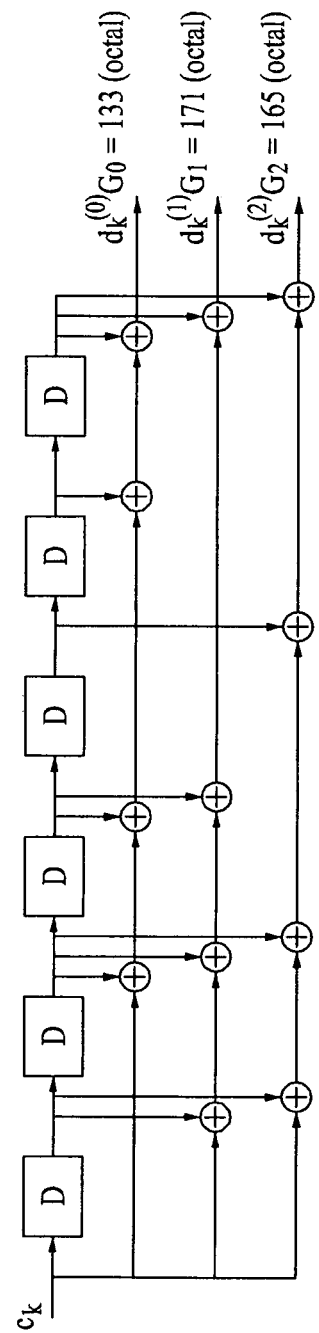
FIG. 28 is a diagram showing an example of a TBCC encoder which may be used in the embodiments of the present invention.

FIG. 28 is a diagram showing an example of a TBCC encoder which may be used in the embodiments of the present invention. In the embodiments of the present invention, channel coding may be performed using the TBCC encoder shown in FIG. 28.

TABLE 8

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 1 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 0 | 1 | 0 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Hereinafter, various channel coding schemes in which the channel coding schemes described in Chapter 4.2 are applied to PUCCH format 3 based on the description of Chapter 4.1 will be described in detail.

4.2.1 Channel Coding Method Based on CQI Payload Size

A UE and/or a BS may select a channel coding scheme in consideration of the payload size of CQI information bits. For example, the UE may dynamically select a channel coding scheme according to a channel state, code CQI and transmit the coded CQI to the BS. Alternatively, the BS may determine the channel coding scheme in advance according to a specific channel state and inform the UE of the channel coding scheme through higher layer signaling (e.g., RRC signaling). Channel coding methods for CQI bits according to CQI payload size will now be described in detail.

Figure 29:
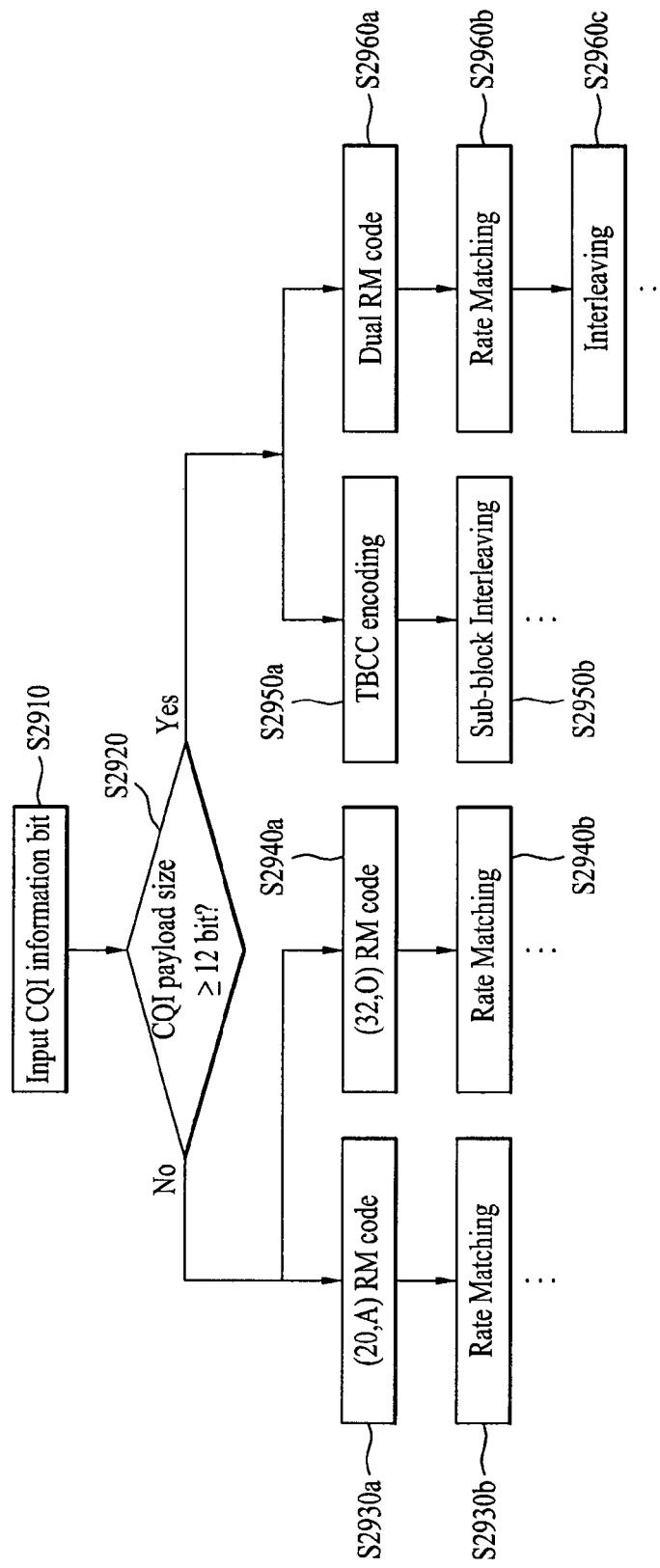
FIG. 29 is a diagram illustrating one method of selecting a channel coding scheme according to a CQI payload size according to an embodiment of the present invention.

FIG. 29 is a diagram illustrating one method of selecting a channel coding scheme according to a CQI payload size according to an embodiment of the present invention.

Referring to FIG. 29, CQI bits are input to a channel coding block (S2910).

Steps 2910 may correspond to step S2410, S2510, S2610 or S2710 described with reference to FIGS. 24 to 27 and the other steps of FIG. 29 may be also applied to FIGS. 24 to 27. Accordingly, for detailed description, refer to FIGS. 24 to 27.

A UE determines whether the size of CQI payload input to the channel coding block is equal to or greater than 12 bits (S2920).

If the size of the CQI payload is less than 12 bits, that is, if the size of the CQI payload is 1 to 11 bits, in step S2920, the UE may code the CQI using the (20, A) RM code or the (32, O) RM code (S2930a and S2940a).

Thereafter, the UE may perform rate matching with respect to the encoded CQI bits (S2930b and S2940b).

For example, in step S2930b, the UE may perform rate matching with 48 bits with respect to the CQI bits coded using the (20, A) RM code according to PUCCH format 3. As another rate matching method, the UE may replicatively use the result of rate matching with 24 bits with respect to the coded CQI bits in both slots including a slot 0 and a slot 1 of PUCCH format 3.

The UE may perform rate matching with 48 bits with respect to the CQI bits according to PUCCH format 3 after coding the CQI bits using the (32, O) RM code. Alternatively, the UE may replicatively use the result of rate matching with bits with respect to the coded CQI bits in both slots including a slot 0 and a slot 1 of PUCCH format 3.

If the size of the CQI payload is equal to or greater than 12 bits in step S2920, the UE may code the CQI using a dual RM scheme using two RM encoders or a TBCC encoding scheme (S2950a and S2960a).

After the CQI is TBCC-coded in step S2950a as shown in FIG. 28, the UE performs subblock interleaving with respect to the TBCC-coded codewords in order to increase puncturing efficiency. For a subblock interleaver used at this time, refer to Section 5.1.4.2.1 of the 3GPP TS 36.212 (S2950b).

If a dual RM encoder is used in step S2960a, one of the (20, A) code described in Table 7 or the (32, O) code described in Table 8 may be used as an RM code. A detailed method of allocating O CQI information bits to a dual RM encoder will now be described.

$\lceil O/2 \rceil$ among the O CQI information bits input in step S2910 may be allocated to a first RM encoder and $\lfloor O/2 \rfloor = O - \lceil O/2 \rceil$ may then be allocated to a second RM encoder and encoding may be performed. If the number of O CQI bits is an odd number, the UE may determine to which RM encoder one CQI bit is further input. For example, if the O CQI bits input in step S2910 are $O_0, O_1, O_2, \ldots, O_{O-1}, O_0, O_1, O_2, \ldots,$ $O_{\lceil O/2 \rceil - 1}$ may be allocated to a first RM encoder and $O_{\lceil O/2 \rceil},$ $O_{\lceil O/2 \rceil + 1}, \ldots, O_{O-1}$ may be allocated to a second RM encoder. Alternatively, if the O CQI bits input in step S2910 are $O_0, O_1, O_2, \ldots, O_{O-1}, O_0, O_2, O_4, \ldots, O_{2 \times (\lceil O/2 \rceil - 1)}$ having even indexes may be allocated to a first RM encoder and $O_1, O_3, O_5, \ldots, O_{2 \times (\lceil O/2 \rceil - 1) + 1}$ having odd indexes may be allocated to a second RM encoder. That is, the CQI payload bits may be interlaced and split to two RM encoders and the CQI information bits may first be allocated to the first RM encoder.

Alternatively, $\lceil O/2 \rceil$ among the O CQI information bits may be allocated to a second RM encoder and $\lfloor O/2 \rfloor = O - \lceil O/2 \rceil$ may then be allocated to a first RM encoder and encoding may be performed. For example, if the O CQI bits are $O_0, O_1, O_2, \ldots, O_{O-1}, O_0, O_1, O_2, \ldots, O_{\lceil O/2 \rceil - 1}$ may be allocated to a second RM encoder and $O_{\lceil O/2 \rceil}, O_{\lceil O/2 \rceil + 1}, \ldots, O_{O-1}$ may be allocated to a first RM encoder. Alternatively, $O_0, O_2,$ $O_4, \ldots, O_{2 \times (\lceil O/2 \rceil - 1)}$ having even indexes among the O CQI information bits may be allocated to a second RM encoder and $O_1, O_3, O_5, \ldots, O_{2 \times (\lceil O/2 \rceil - 1) + 1}$ having odd indexes may be allocated to a first RM encoder. That is, the CQI payload bits may be interlaced and split to two RM encoders and the CQI information bits may first be allocated to the second RM encoder.

Referring to FIG. 29 again, after performing step S2960a, the UE may sequentially perform rate matching with respect to the CQI bits (that is, codewords) encoded using the dual RM code (S2960b).

At this time, in step S2960b, the codewords coded using the dual RM code are subjected to rate matching in units of 24 bits and split to be mapped to two slots of PUCCH format 3.

For example, in step S2960b, the codeword coded using the first RM encoder may be mapped to a first slot and the codeword coded using the second RM encoder may be mapped to a second slot. Alternatively, the codeword coded using the first RM encoder may be mapped to the second slot and the codeword coded using the second RM encoder may be mapped to the first slot.

During a process of concatenating the two codewords generated by coding the CQI using the dual RM code, interleaving may be performed (S2960c).

The UE may use an interleaver of a bit unit in step S2960c. For example, if the output codeword of the first RM encoder is $b_0^1, b_1^1, b_2^1, \ldots, b_{23}^1$ and the output codeword of the second RM encoder is $b_0^2, b_1^2, b_2^2, \ldots, b_{23}^2$, the UE may generate and output $b_0^1, b_0^2, b_1^1, b_1^2, b_2^1, b_2^2, \ldots, b_{23}^1, b_{23}^2$ using the interleaver of the bit unit.

Alternatively, the UE may use an interleaver of a symbol unit in step S2960c. Since only QPSK is used in a PUCCH, the interleaver used at this time may be an interleaver of a 2-bit vector sequence unit. For example, if the output codeword of the first RM encoder is $b_0^1, b_1^1, b_2^1, \ldots, b_{23}^1$ and the output codeword of the second RM encoder is $b_0^2, b_1^2,$ $b_2^2, \ldots, b_{23}^2$, the UE may generate and output $b_0^1, b_1^1, b_0^2,$ $b_1^2, b_2^1, b_3^1, b_2^2, b_3^2, \ldots, b_{22}^1, b_{23}^1, b_{22}^2, b_{23}^2$ using the interleaver of the symbol unit.

The UE may map the CQI to PUCCH format 3 and transmit the CQI to the BS by performing the steps of FIG. 29. In FIG. 29, step S2910 may correspond to step S2410, S2510, S2610 or S2710 described with reference to FIGS. 24 to 27 and the other steps of FIG. 29 may be also applied to FIGS. 24 to 27. Accordingly, for the detailed description except for mapping of the CQI to PUCCH format 3, refer to FIGS. 24 to 27.

Figure 30:
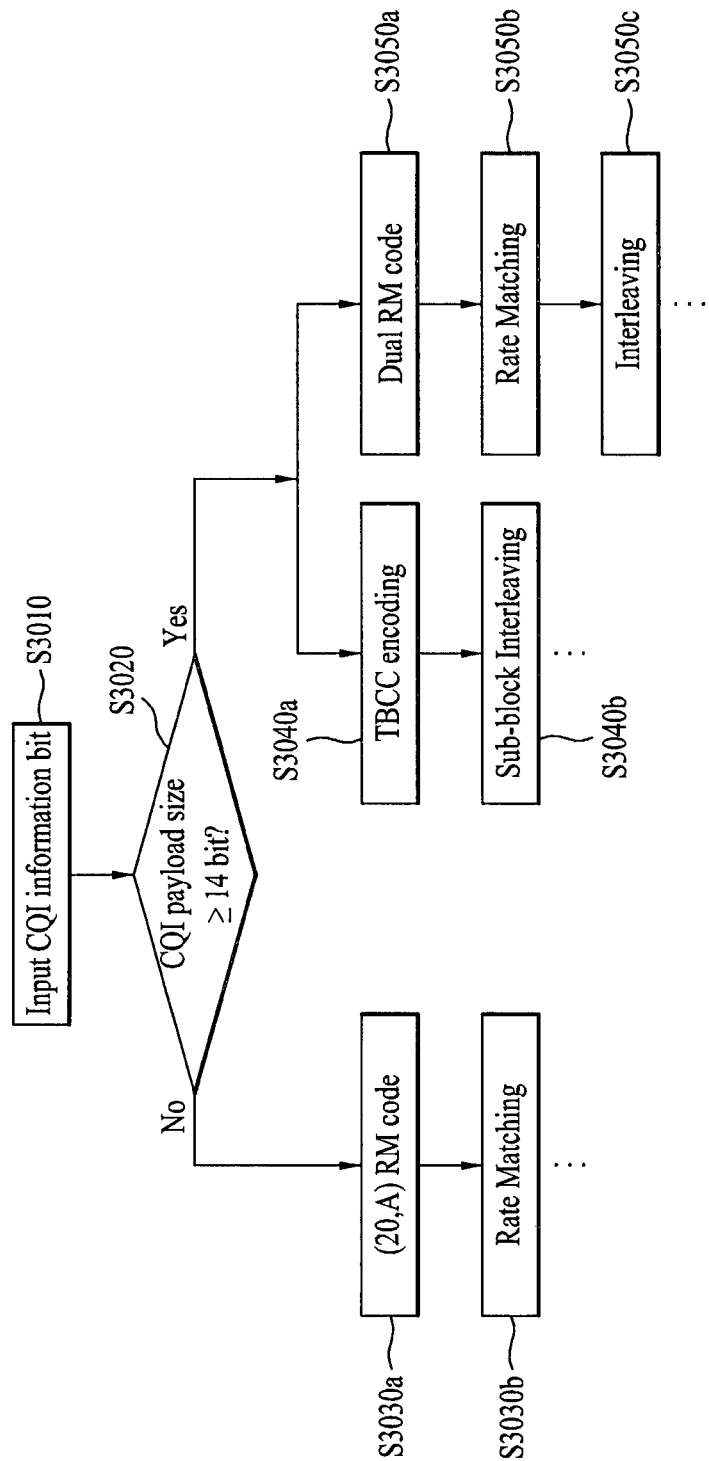
FIG. 30 is a diagram illustrating another method of selecting a channel coding scheme according to a CQI payload size according to an embodiment of the present invention.

FIG. 30 is a diagram illustrating another method of selecting a channel coding scheme according to a CQI payload size according to an embodiment of the present invention.

Referring to FIG. 30, CQI bits are input to a channel coding block (S3010).

A UE determines whether the size of CQI payload input to the channel coding block is equal to or greater than 14 bits (S3020).

If the size of the CQI payload is less than 14 bits, that is, if the size of the CQI payload is 1 to 13 bits, in step S3020, the UE may code the CQI using the (20, A) RM code (S3030a).

Thereafter, the UE may perform rate matching with respect to the coded CQI bits (S3030b).

For example, in step S3030b, the UE may perform rate matching with 48 bits with respect to the CQI bits coded using the (20, A) RM code according to PUCCH format 3. As another rate matching method, the UE may replicatively use the result of rate matching with 24 bits with respect to the coded CQI bits in both slots including a slot 0 and a slot 1 of PUCCH format 3.

If the size of the CQI payload is equal to or greater than 14 bits in step S3020, the UE may encode the CQI using a dual RM scheme using two RM encoders or a TBCC encoding scheme (S3040a and S3050a).

After the CQI is TBCC-coded in step S3040a as shown in FIG. 28, the UE performs subblock interleaving with respect to the TBCC-coded codewords in order to increase puncturing efficiency. For a subblock interleaver used at this time, refer to Section 5.1.4.2.1 of the 3GPP TS 36.212 (S3040b).

If a dual RM encoder is used in step S3050a, one of the (20, A) code described in Table 7 or the (32, O) code described in Table 8 may be used as an RM code. A detailed method of allocating O CQI bits to a dual RM encoder will now be described.

$\lceil O/2 \rceil$ among the O CQI information bits input in step S3010 may be allocated to a first RM encoder and $\lfloor O/2 \rfloor = O - \lceil O/2 \rceil$ may then be allocated to a second RM encoder and encoding may be performed. If the number of O CQI bits is an odd number, the UE may determine to which RM encoder one CQI bit is further input. For example, if the O CQI bits input in step S3010 are $O_0, O_1, O_2, \ldots, O_{O-1}, O_0, O_1, O_2, \ldots, O_{\lceil O/2 \rceil - 1}$ may be allocated to a first RM encoder and $O_{\lceil O/2 \rceil}, O_{\lceil O/2 \rceil + 1}, \ldots, O_{O-1}$ may be allocated to a second RM encoder. Alternatively, if the O CQI bits input in step S3010 are $O_0, O_1, O_2, \ldots, O_{O-1}, O_0, O_2, O_4, \ldots, O_{2 \times (\lceil O/2 \rceil - 1)}$ having even indexes may be allocated to a first RM encoder and $O_1, O_3, O_5, \ldots, O_{2 \times (\lfloor O/2 \rfloor - 1) + 1}$ having odd indexes may be allocated to a second RM encoder. That is, the CQI payload bits may be interlaced and split to two RM encoders and the CQI information bits may first be allocated to the first RM encoder.

Alternatively, $\lceil O/2 \rceil$ among the O CQI bits input in step S3010 may be allocated to a second RM encoder and $\lfloor O/2 \rfloor = O - \lceil O/2 \rceil$ may then be allocated to a first RM encoder and encoding may be performed. For example, if the input O CQI bits are $O_0, O_1, O_2, \ldots, O_{O-1}, O_0, O_1, O_2, \ldots, O_{\lceil O/2 \rceil - 1}$ may be allocated to a second RM encoder and $O_{\lceil O/2 \rceil}, O_{\lceil O/2 \rceil + 1}, \ldots, O_{O-1}$ may be allocated to a first RM encoder. Alternatively, $O_0, O_2, O_4, \ldots, O_{2 \times (\lceil O/2 \rceil - 1)}$ having even indexes among the O CQI information bits may be allocated to a second RM encoder and $O_0, O_3, O_5, \ldots, O_{2 \times (\lfloor O/2 \rfloor - 1) + 1}$ having odd indexes may be allocated to a first RM encoder. That is, the CQI payload bits may be interlaced and split to two RM encoders and the CQI information bits may first be allocated to the second RM encoder.

Referring to FIG. 30 again, after performing step S3050a, the UE may sequentially perform rate matching with respect to the CQI information bits (that is, codewords) coded using the dual RM code (S3050b).

At this time, the codewords coded using the dual RM code are subjected to rate matching with 24 bits in step S3050b and split and input to two slots of PUCCH format 3.

For example, in step S3050b, the CQI codewords coded by the dual RM encoder may be subjected to rate matching with 24 bits and split and input to the two slots of PUCCH format 3. That is, the codeword coded using the first RM encoder may be mapped to a first slot and the codeword coded using the second RM encoder may be mapped to a second slot.

Alternatively, the codeword encoded using the first RM encoder may be mapped to the second slot and the codeword encoded using the second RM encoder may be mapped to the first slot.

In a process of concatenating the two codewords generated by coding the CQI using the dual RM code, the UE may perform interleaving (S3060c).

The UE may use an interleaver of a bit unit in step S3060c. For example, if the output codeword of the first RM encoder is $b_0^1, b_1^1, b_2^1, \ldots, b_{23}^1$ and the output codeword of the second RM encoder is $b_0^2, b_1^2, b_2^2, \ldots, b_{23}^2$ the UE may generate and output $b_0^1, b_0^2, b_1^1, b_1^2, b_2^1, b_2^2, \ldots, b_{23}^1, b_{23}^2$ using the interleaver of the bit unit.

Alternatively, the UE may use an interleaver of a symbol unit in step S3060c. Since only QPSK is used in a PUCCH, the interleaver used at this time may be an interleaver of a 2-bit vector sequence unit. For example, if the output codeword of the first RM encoder is $b_0^1, b_1^1, b_2^1, \ldots, b_{23}^1$ and the output codeword of the second RM encoder is $b_0^2, b_1^2, b_2^2, \ldots, b_{23}^2$, the UE may generate and output $b_0^1, b_1^1, b_0^2, b_1^2, b_2^1, b_3^1, b_2^2, b_3^2, \ldots, b_{22}^1, b_{23}^1, b_{22}^2, b_{23}^2$ using the interleaver of the symbol unit.

The UE may map the CQI to PUCCH format 3 and transmit the CQI by performing the steps of FIG. 30. In FIG. 30, step S3010 may correspond to step S2410, S2510, S2610 or S2710 described with reference to FIGS. 24 to 27 and the other steps of FIG. 30 may be also applied to FIGS. 24 to 27. Accordingly, for the detailed description except for mapping of the CQI to PUCCH format 3, refer to FIGS. 24 to 27.

The methods described with reference to FIGS. 29 and 30 may be used according to the size of the CQI payload. In addition, the UE may individually use each channel coding method according to channel state.

4.2.2 Channel Coding Scheme Regardless of Size of COI Payload

Hereinafter, methods of applying the same channel coding regardless of the size of the CQI payload will be described as the embodiments of the present invention.

4.2.2.1 Method of Using TBCC

The UE may always code CQI using a TBCC regardless of the size of the CQI payload if the CQI is transmitted using PUCCH format 3. As the TBCC used at this time, a TBCC for coding CQI having a payload size of 14 bits or more at a PUSCH may be used (see FIG. 28).

The UE may code the CQI using TBCC and interleave the coded codewords for puncturing efficiency. For a subblock interleaver used at this time, refer to Section 5.1.4.2.1 of the 3GPP TS 36.212.

4.2.2.2 Method of Using Dual RM Encoder

If CQI is transmitted using PUCCH format 3, the UE may always use a dual RM encoder regardless of the size of the CQI payload. If the UE uses the dual RM encoder, the UE may use one of the (20, A) code described in Table 7 or the (32, O) code described in Table 8 as an RM code. A detailed method of allocating O CQI information bits to a dual RM encoder will now be described.

$\lceil O/2 \rceil$ among the O CQI bits input to the channel coding block may be allocated to a first RM encoder and $\lfloor O/2 \rfloor = O - 1 \lceil O/2 \rceil$ may then be allocated to a second RM encoder and encoding may be performed. If the number of O CQI bits is an odd number, the UE may determine to which RM encoder one CQI bit is further input. For example, if the input Q CQI bits are $O_0, O_1, O_2, \ldots, O_{O-1}, O_0, O_1, O_2, \ldots, O_{\lceil O/2 \rceil - 1}$ may be allocated to a first RM encoder and $O_{\lceil O/2 \rceil}, O_{\lceil O/2 \rceil + 1}, \ldots, O_{O-1}$ may be allocated to a second RM encoder. Alternatively, if the input Q CQI bits are $O_0, O_1, O_2, \ldots, O_{O-1}, O_0, O_2, O_4, O_{2 \times (\lceil O/2 \rceil - 1)}$ having even indexes may be allocated to a first RM encoder and $O_1, O_3, O_5, \ldots, O_{2 \times (\lfloor O/2 \rfloor - 1) + 1}$ having odd indexes may be allocated to a second RM encoder. That is, the CQI payload bits may be interlaced and split to two RM encoders and the CQI information bits may first be allocated to the first RM encoder.

Alternatively, $\lceil O/2 \rceil$ among the O CQI bits input to the channel coding block may be allocated to a second RM encoder and $\lfloor O/2 \rfloor = O - 1 \lceil O/2 \rceil$ may then be allocated to a first RM encoder and encoding may be performed. For example, if the input Q CQI bits are $O_0, O_1, O_2, \ldots, O_{O-1}, O_0, O_1, O_2, \ldots, O_{\lceil O/2 \rceil - 1}$ may be allocated to a second RM encoder and $O_{\lceil O/2 \rceil}, O_{\lceil O/2 \rceil + 1}, \ldots, O_{O-1}$ may be allocated to a first km encoder. Alternatively, $O_0, O_2, O_4, \ldots, O_{2 \times (\lceil O/2 \rceil - 1)}$ having even indexes among the O CQI information bits may be allocated to a second RM encoder and $O_1, O_3, O_5, \ldots, O_{2 \times (\lfloor O/2 \rfloor - 1) + 1}$ having odd indexes may be allocated to a first RM encoder. That is, the CQI payload bits may be interlaced and split to two RM encoders and the CQI information bits may first be allocated to the second RM encoder.

Thereafter, the codewords coded using the dual RM code are subjected to rate matching with 24 bits and split to be mapped to two slots of PUCCH format 3.

For example, the codeword coded using the first RM encoder may be mapped to a first slot and the codeword coded using the second RM encoder may be mapped to a second slot. Alternatively, the codeword coded using the first RM encoder may be mapped to the second slot and the codeword coded using the second RM encoder may be mapped to the first slot.

In a process of concatenating the two codewords generated by coding the CQI using the dual RM code, the UE may perform interleaving.

At this time, the UE may use an interleaver of a bit unit. For example, if the output codeword of the first RM encoder is $b_0^1, b_1^1, b_2^1, \ldots, b_{23}^1$ and the output codeword of the second RM encoder is $b_0^2, b_1^2, b_2^2, \ldots, b_{23}^2$, the UE may generate and output $b_0^1, b_0^2, b_1^1, b_1^2, b_2^1, b_2^2, \ldots, b_{23}^1, b_{23}^2$ using the interleaver of the bit unit.

Alternatively, the UE may use an interleaver of a symbol unit. Since only QPSK is used in a PUCCH, the interleaver used at this time may be an interleaver of a 2-bit vector sequence unit. For example, if the output codeword of the first RM encoder is $b_0^1, b_1^1, b_2^1 \ldots, b_{23}^1$ and the output codeword of the second RM encoder is $b_0^2, b_1^2, b_2^2 \ldots, b_{23}^2$ the UE may generate and output $b_0^1, b_1^1, b_0^2, b_1^2, b_2^1, b_3^1, b_2^2, b_3^2, \ldots, b_{22}^1, b_{23}^1, b_{22}^2, b_{23}^2$ using the interleaver of the symbol unit.

4.2.3 Channel Coding Method without Using CRC

A UE may not use CRC in the case in which CQI is transmitted to a BS using PUCCH format 3. At this time, there is no limitation as to a channel coding method used by a UE. That is, all of a method of coding CQI using one RM code and performing circular expansion, a method of using a dual RM encoder and a TBCC method may be used.

That is, CRC may not be used in various channel coding methods described in Chapters 4.2.1 to 4.2.2.

4.2.4 Channel Coding Method Using CRC

A UE may use CRC in the case in which CQI is transmitted using PUCCH format 3 and TBCC is used to perform channel coding with respect to the CQI. For example, CRC used by the UE may be 8-bit CRC applied when CQI is transmitted through a PUSCH. At this time a polynomial used to generate CRC is expressed by Equation 3.

$$g_{CRC8}(D) = [D^8 + D^7 + D^4 + D^3 + D + 1] \qquad \text{Equation 3}$$

5. Implementation Apparatus

Figure 31:
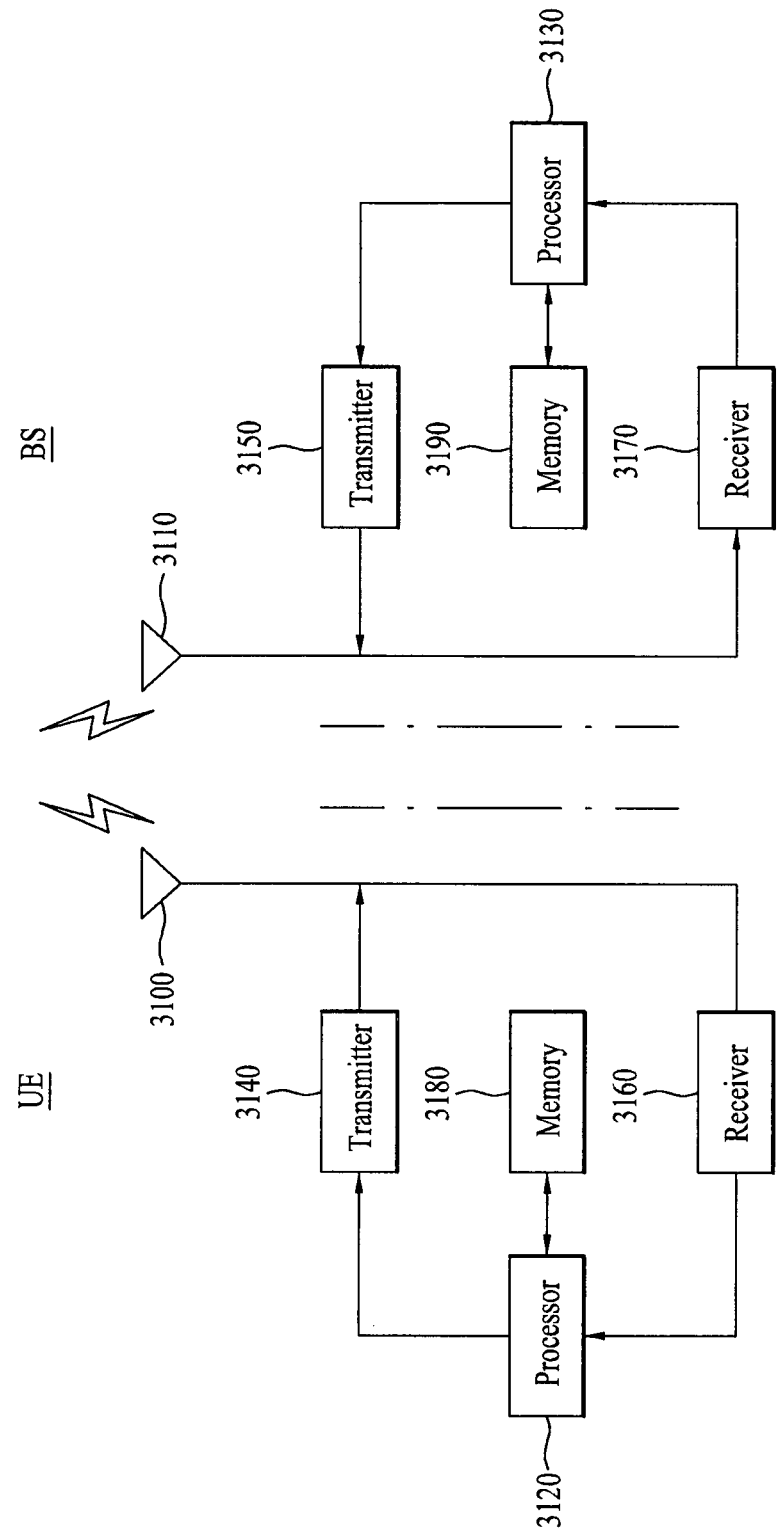
FIG. 31 is a diagram showing an apparatus for implementing the methods described with reference to FIGS. 1 to 30.

The apparatus described with reference to FIG. 31 can implement the methods described in FIGS. 1 to 30.

A UE may operate as a transmitter in uplink and operate as a receiver in downlink. In addition, a BS (eNB) may operate a receiver in uplink and operate as a transmitter in downlink.

That is, the UE and the BS may respectively include transmission (Tx) modules 3140 and 3150 and reception (Rx) modules 3160 and 3170, in order to control transmission and reception of information, data and/or message. The UE and the BS may include antennas 3100 and 3110 for transmitting/receiving information, data and/or messages, respectively.

The UE and the BS may include processors 3120 and 3130 for performing the above-described embodiments of the present invention and memories 3180 and 3190 for temporarily or permanently storing processing procedures of the processors, respectively.

The embodiments of the present invention may be implemented using the above-described components and functions of the UE and the BS. At this time, the apparatus described with reference to FIG. 31 may further include the configurations of FIGS. 2 to 4. Preferably, the processors may include the configuration of FIGS. 2 to 4.

The processor of the UE may monitor a search space and receive a PDCCH signal. In particular, an LTE-A UE may perform blind decoding (BD) with respect to an extended CSS so as to receive a PDCCH without blocking a PDCCH signal of another LTE UE.

In addition, the UE may receive DL data using PDSCH resources allocated through a PDCCH. In particular, the processors 3120 may transmit channel state control information (CQI/PMI) to the BS using PUCCH format 3. That is, the processor of the UE may transmit, to the BS, the CQI/PMI, which is encoded, is subjected to rate matching and is interleaved using PUCCH format 3 according to the embodiments of the present invention.

For example, the UE may map the CQI to PUCCH format 3 by applying the control information transmission method and the CQI information bit coding methods using PUCCH format 3 described in Chapters 3 and 4, and transmit the CQI to the BS.

The Tx modules and the Rx modules included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 31 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 3180 and 3190 so that it can be driven by the processors 3120 and 3130. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

[Industrial Applicability]

The present invention is applicable to various wireless access systems. Examples of the various wireless access systems include a 3$^{rd}$ Generation Partnership Project (3GPP) system, a 3GPP2 system and/or an Institute of Electrical and Electronic Engineers (IEEE) 802.xx system.

The embodiments of the present invention are applicable to all technical fields using the various wireless access systems in addition to the various wireless access systems.

The invention claimed is:

1. A method of transmitting uplink control information (UCI) in a wireless access system, the method performed by a user equipment (UE) and comprising:
performing channel coding with respect to the UCI according to a payload size of the UCI including acknowledgement information and channel quality information (CQI);
performing rate matching with respect to the channel coded UCI for a physical uplink control channel (PUCCH) format 3; and
transmitting the rate matched UCI using the PUCCH format 3,
wherein the channel coding is performed by using a (32, O) code when the payload size of the UCI is less than or equal to 11 bits,
wherein the channel coding is performed by using two (32, O) codes when the payload size of the UCI is greater than or equal to 12 bits, and
wherein 'O' is the payload size of the UCI.

2. The method according to claim 1, wherein the UE performs the rate matching with 48 bits with respect to the channel coded UCI for the PUCCH format 3, when the payload size of the UCI is less than or equal to 11 bits.

3. The method according to claim 1, wherein the UE inputs the result of rate matching with 24 bits with respect to the channel coded UCI to two slots of a subframe for the PUCCH format 3, when the payload size of the UCI is greater than or equal to 12 bits.

4. The method according to claim 1, further comprising performing interleaving for result bits of the rate matching, when the payload size of the UCI is greater than or equal to 12 bits.

5. A user equipment (UE) for transmitting uplink control information (UCI) in a wireless access system, the UE comprising:
a transmitter; and
a processor configured to support the transmission of the UCI,
wherein the processor is configured to:
perform channel coding with respect to the UCI according to a payload size of the UCI;
perform rate matching with respect to the channel coded UCI for a physical uplink control channel (PUCCH) format 3; and
transmit the rate matched UCI using the PUCCH format 3 through the transmitter,
wherein the channel coding is performed by using a (32, O) code when the payload size of the UCI is less than or equal to 11 bits,
wherein the channel coding is performed by using two (32, O) codes when the payload size of the UCI is greater than or equal to 12 bits,
wherein the UCI includes acknowledgement information and channel quality information (CQI), and
wherein 'O' is the payload size of the UCI.

6. The UE according to claim 5, wherein the UE performs the rate matching with 48 bits with respect to the channel coded UCI for the PUCCH format 3, when the payload size of the UCI is less than or equal to 11 bits.

7. The UE according to claim 5, wherein the UE inputs the result of rate matching with 24 bits with respect to the channel coded UCI to two slots of a subframe for the PUCCH format 3, when the payload size of the UCI is greater than or equal to 12 bits.

8. The UE according to claim 5, wherein the processor is further configured to perform interleaving for result bits of the rate matching, when the payload size of the UCI is greater than or equal to 12 bits.

9. The UE according to claim 5, wherein $O_0, O_1, O_2, \ldots, O_{\lceil O/2 \rceil - 1}$ bits of the UCI are allocated to a first (32, O) code and $O_{\lceil O/2 \rceil}, O_{\lceil O/2 \rceil + 1}, \ldots, O_{O-1}$ are allocated to a second (32, O) code, when the payload size of the UCI is greater than or equal to 12 bits.

10. The UE according to claim 5, wherein the payload size of the UCI is determined by only considering a size of the CQI included in the UCI even the UCI includes other control information.

11. The method according to claim 1, wherein $O_0, O_1, O_2, \ldots, O_{\lceil O/2 \rceil - 1}$ bits of the UCI are allocated to a first (32, O) code and $O_{\lceil O/2 \rceil}, O_{\lceil O/2 \rceil - 1}, \ldots, O_{O-1}$ bits of the UCI are allocated to a second (32, O) code, when the payload size of the UCI is greater than or equal to 12 bits.

12. The method according to claim 1, wherein the payload size of the UCI is determined by only considering a size of the CQI included in the UCI even the UCI includes other control information.

* * * * *